(12) United States Patent
Kobayashi

(10) Patent No.: US 7,681,716 B2
(45) Date of Patent: Mar. 23, 2010

(54) WORK CONVEYING APPARATUS, METHOD FOR PRODUCING WORK AND METHOD FOR PRODUCING IMAGE FORMING APPARATUS

(75) Inventor: Takashi Kobayashi, Mishima (JP)

(73) Assignee: Ricoh Company, Ltd., Tokyo (JP)

( * ) Notice: Subject to any disclaimer, the term of this patent is extended or adjusted under 35 U.S.C. 154(b) by 818 days.

(21) Appl. No.: 11/366,403

(22) Filed: Mar. 3, 2006

(65) Prior Publication Data

US 2007/0051586 A1    Mar. 8, 2007

(30) Foreign Application Priority Data

Sep. 2, 2005   (JP) ............................. 2005-255226
Feb. 3, 2006   (JP) ............................. 2006-027464

(51) Int. Cl.
*B23P 19/00*    (2006.01)

(52) U.S. Cl. ....................... 198/747; 198/583; 198/749; 198/860.2

(58) Field of Classification Search ................. 198/583, 198/736, 747, 749, 750.1, 751, 860.2
See application file for complete search history.

(56) References Cited

U.S. PATENT DOCUMENTS

| 4,136,766 | A | * | 1/1979  | Pryor et al. ................. 198/368 |
| 4,326,624 | A | * | 4/1982  | Ewertowski et al. ........ 198/364 |
| 4,421,446 | A | * | 12/1983 | Leon et al. .................... 414/17 |
| 4,669,388 | A | * | 6/1987  | Dehne et al. ................ 104/162 |
| 5,195,630 | A | * | 3/1993  | Donovan et al. ......... 198/465.3 |
| 5,398,600 | A | * | 3/1995  | Madsen et al. ................ 99/477 |
| 6,817,467 | B2 |   | 11/2004 | Watanabe et al. |

FOREIGN PATENT DOCUMENTS

JP    2000-296422    10/2000
JP    2005-144603    6/2005

* cited by examiner

*Primary Examiner*—Douglas A Hess
(74) *Attorney, Agent, or Firm*—Oblon, Spivak, McClelland, Maier & Neustadt, L.L.P.

(57) ABSTRACT

A work conveying apparatus including at least one movable work conveying device to support a work, a drive device capable of reciprocating by a predetermined distance in a predetermined direction, and a latching portion formed on at least one of the working conveying device and the drive device and configured to latch the working conveying device with the drive device and move the work conveying device when the drive device is moved in one direction in the reciprocating direction.

27 Claims, 23 Drawing Sheets

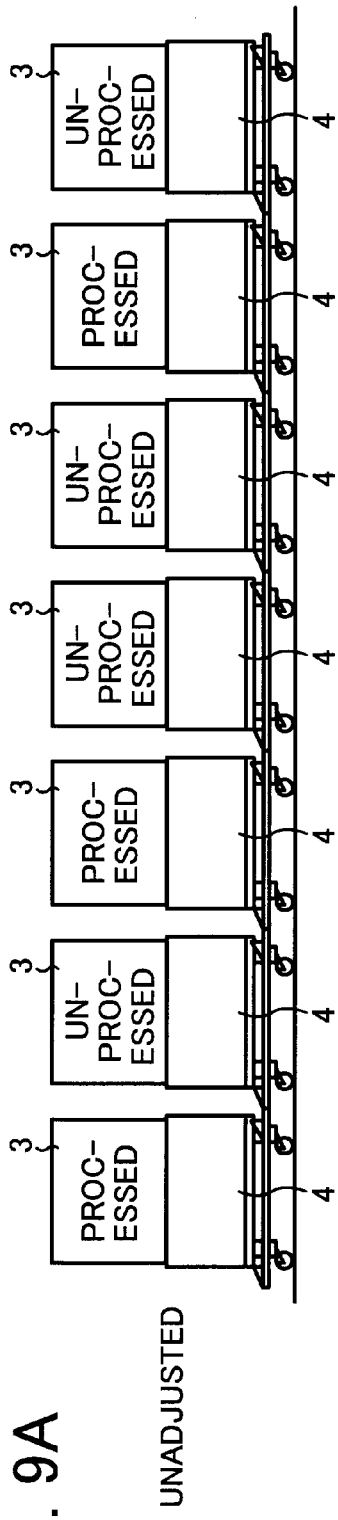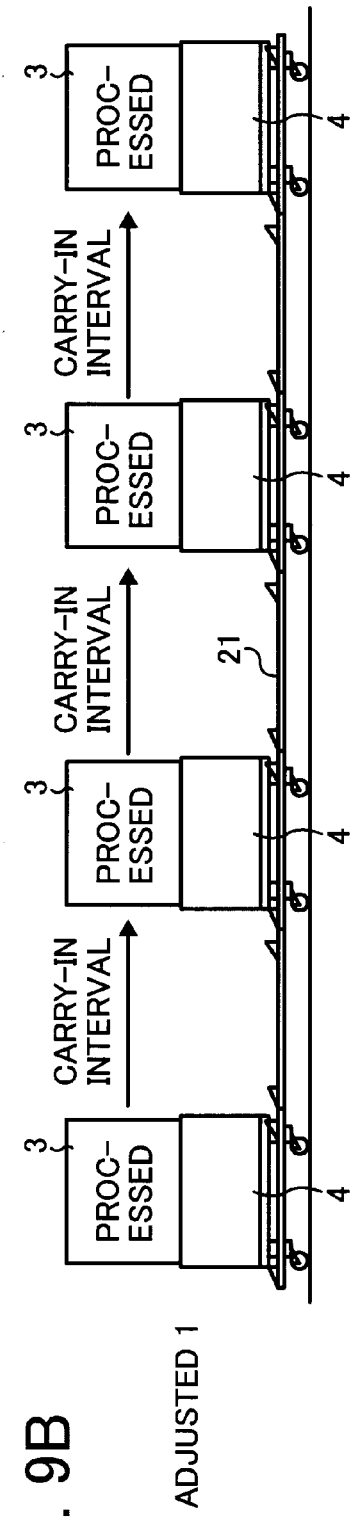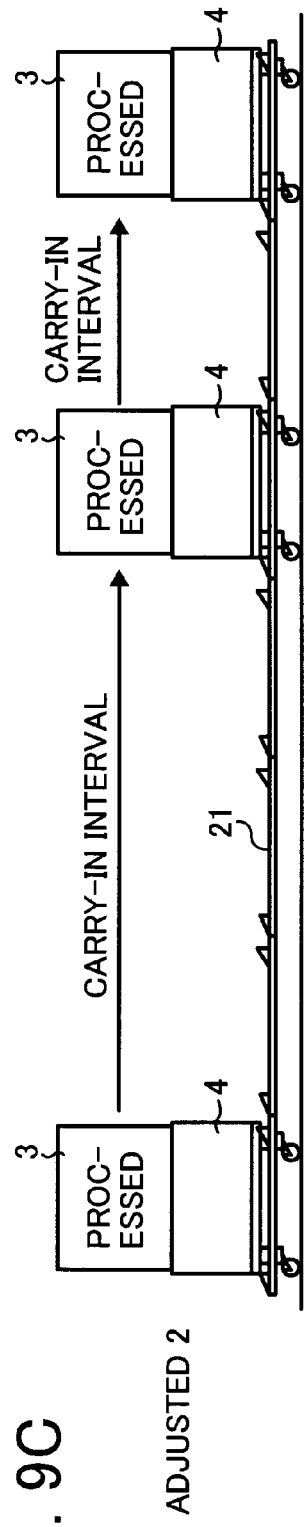
FIG. 9A UNADJUSTED
FIG. 9B ADJUSTED 1
FIG. 9C ADJUSTED 2

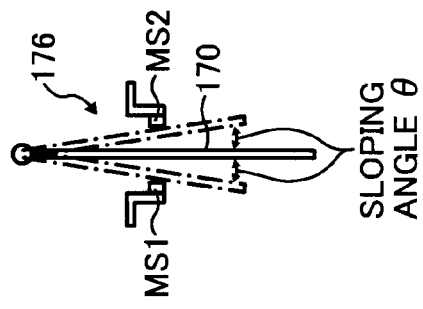
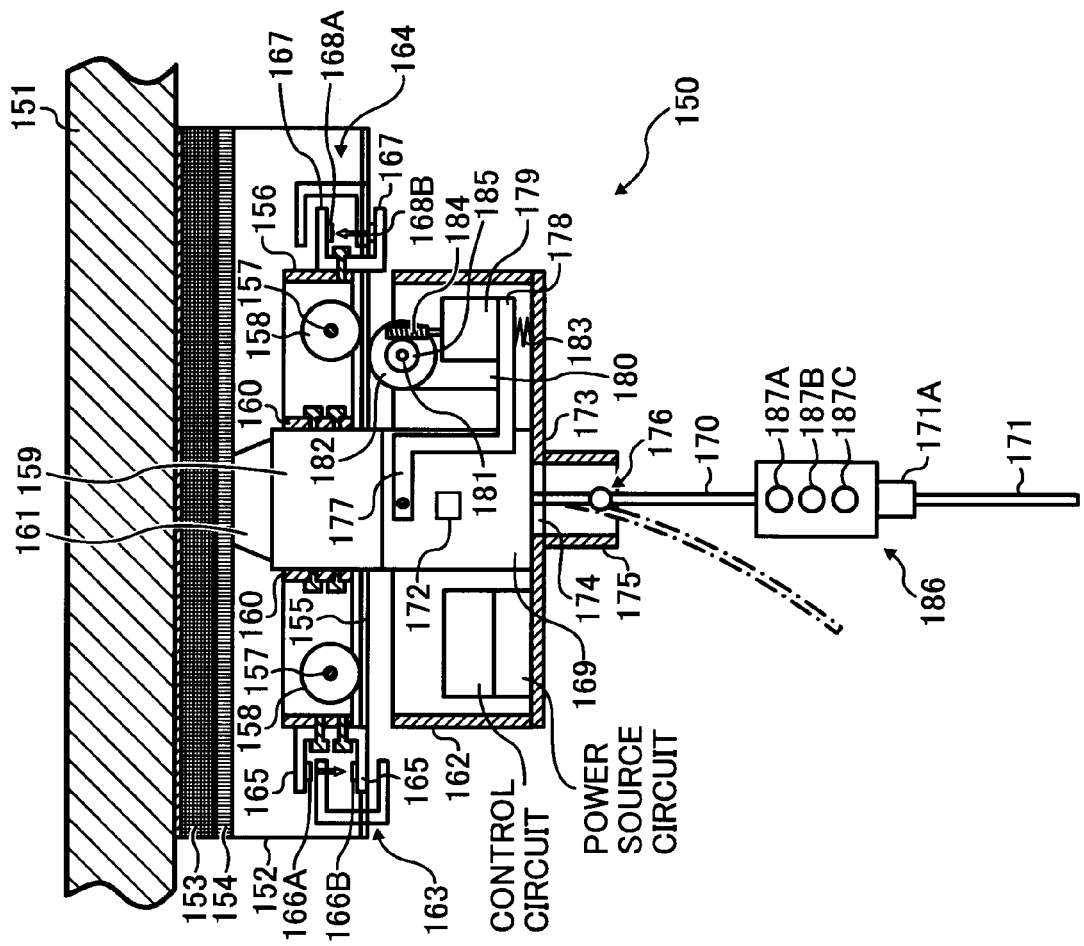

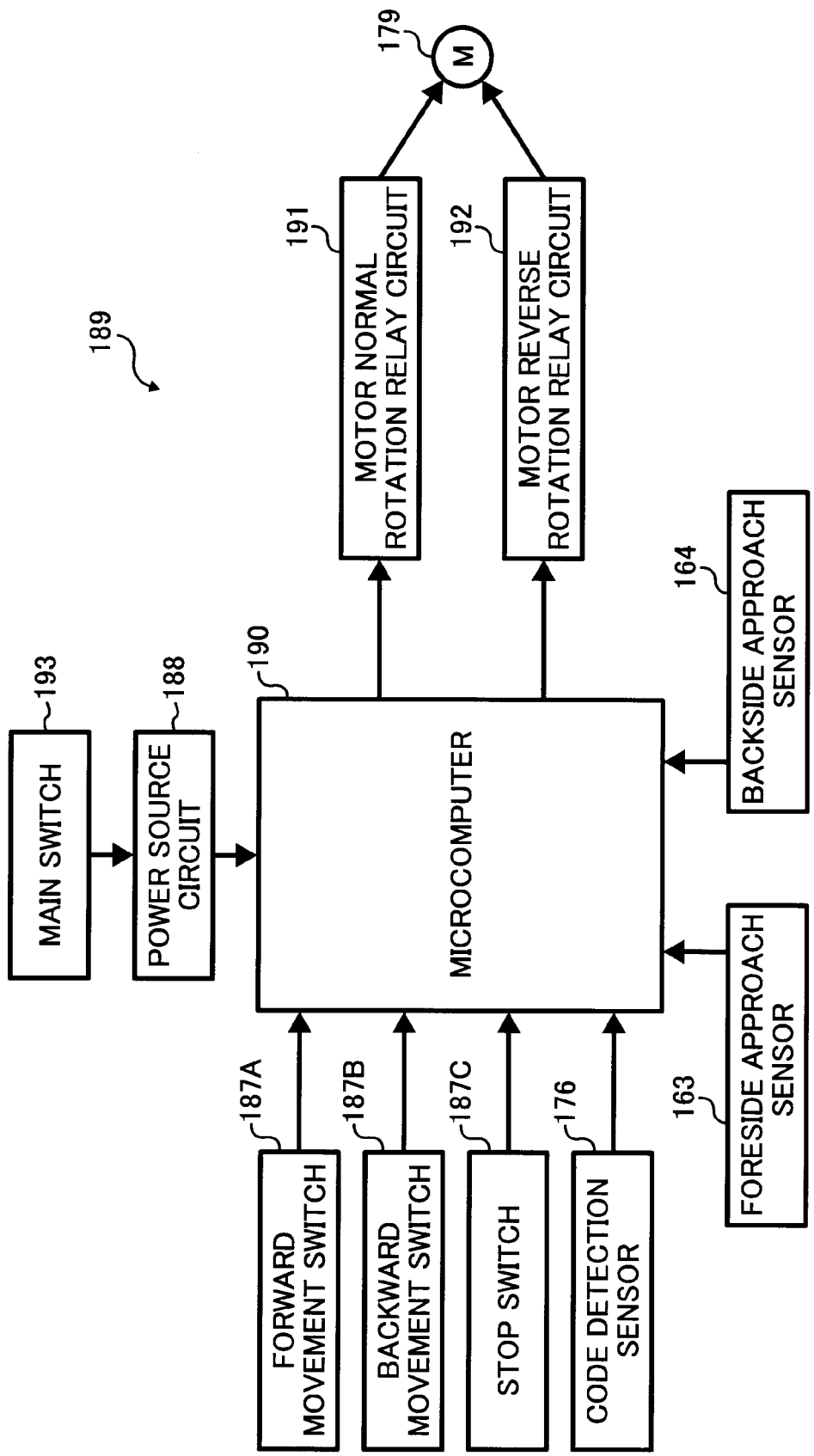

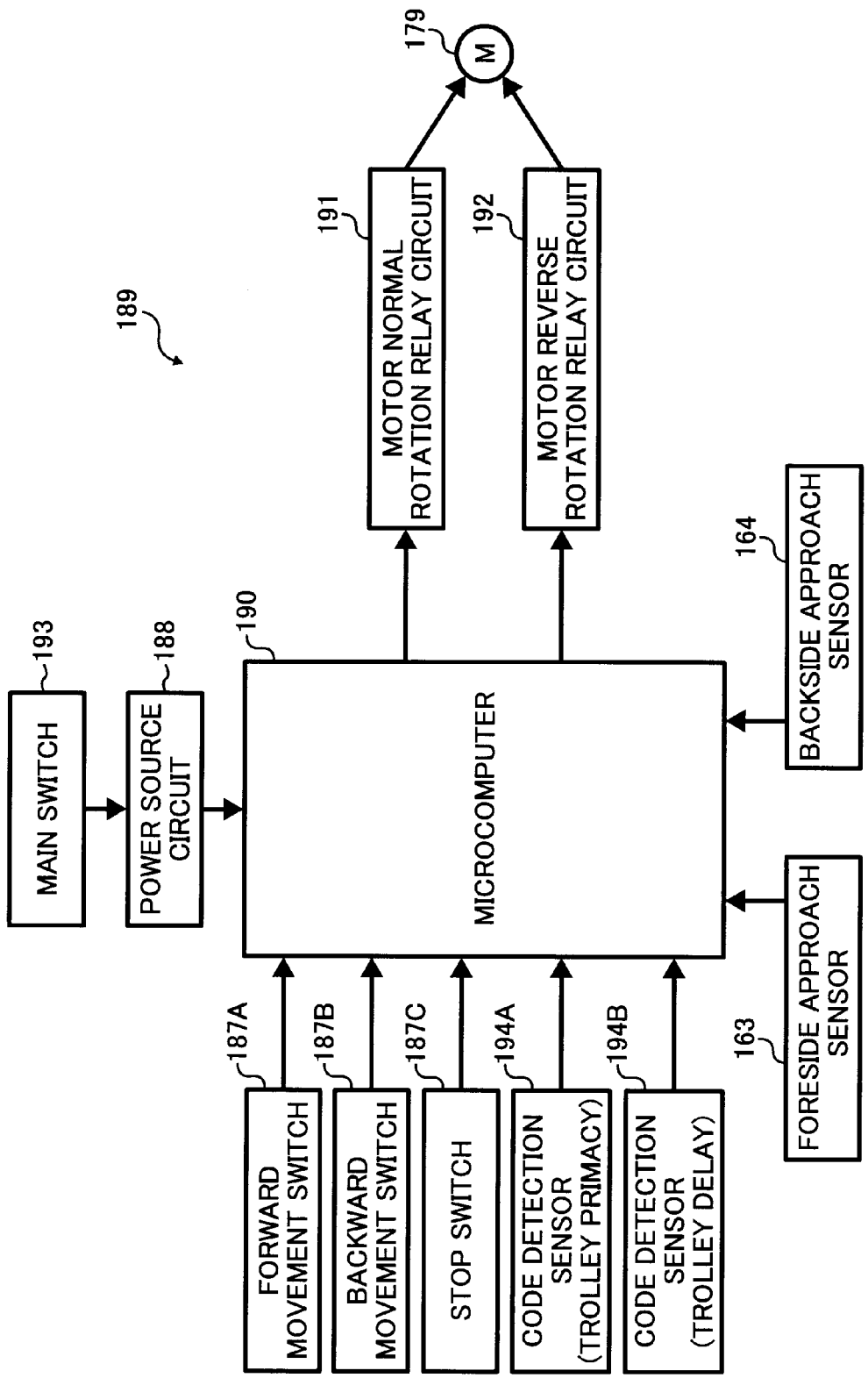

WORK CONVEYING APPARATUS, METHOD FOR PRODUCING WORK AND METHOD FOR PRODUCING IMAGE FORMING APPARATUS

BACKGROUND OF THE INVENTION

1. Field of the Invention

The present invention relates to a work conveying apparatus and a work conveying method configured to convey a work by a carriage.

2. Description of Related Art

Conventionally, there is known a work conveying method in which a plurality of works assembled as a product are mounted on and conveyed by a plurality of continuously disposed carriages, respectively in order to mass-produce plural kinds of products.

Japanese Patent Laid-Open No. 2000-296422 discloses a work conveying method used for an assembly process in which plural kinds of works produced by different assembly processes are conveyed along a predetermined conveying path together, and a desired assembly operation is applied to each work in the middle of the conveyance.

In the work conveying method, the works are conveyed simultaneously by inputting a plurality of running carriages which is configured to mount the works thereon and arranged in contact with each other along the conveying path in sequence one by one to an upstream of the conveying path. Each of the running carriages has at an upper surface thereof a work mounting part and a forward and backward length of each carriage is adjustable. Before the running carriages are inputted to the upstream of the conveying path, a forward and backward length of each of the inputted running carriages is adjusted based on a kind of each work placed on the carriage.

Japanese patent Laid-Open No. 2005-144603 shows a work assembling line and a work conveying carriage in which a main pallet section for mounting a work thereon and configured to achieve an assembling operation and a presetting section to support a plurality of parts assembled to the work are disclosed. The work assembly line includes an assembly starting station to place the work on the main pallet section, a presetting station to place the parts on the presetting section and an assembly station to assemble the parts on the presetting section to the work on the main pallet section.

However, in the work conveying method disclosed in Japanese Patent Laid-Open No. 2000-296422, because grooves for forming an outward conveying path for the carriages must be provided in a floor of a factory and tunnels for forming a homeward conveying path for the carriages must be provided below the outward conveying path, it is difficult to change an assembly system.

Moreover, the work conveying method disclosed in Japanese patent Laid-Open No. 2005-144603, because the main pallet section to support the work can be moved on a pair of rails, a considerable time and a lot of trouble are required to move the rails. Accordingly, there is a problem that even if the change of the work producing processes is required, the change of layout of the conveying path or system is difficult, and the system and the repair are expensive.

In both the work conveying methods as mentioned above, if the plurality of running carriages or stations are connected and moved, it is necessary to a considerable power for a drive motor. In particular, if an assembly operation is executed at each assembly operational position, because the movement and stop of the work are intermittently conducted, there is a problem that a higher power is required for the drive motor, thereby a larger energy is expended.

SUMMARY OF THE INVENTION

An object of the present invention is to provide a work conveying apparatus and a work conveying method To accomplish the above object, a work conveying apparatus according to one embodiment of the present invention includes at least one movable work conveying device to support a work, a drive device capable of reciprocating by a predetermined distance in a predetermined direction, and a latching portion formed on at least one of the working conveying device and the drive device and configured to latch the working conveying device with the drive device and move the work conveying device when the drive device is moved in one direction in the reciprocating direction.

A work conveying apparatus according to another embodiment of the present invention includes at least one movable work conveying device to support a work, a drive device capable of reciprocating by a predetermined distance in a predetermined direction, a transmission device connected to the drive device and extending in the reciprocating direction to form a conveying path of the work, and a latching portion provided to cooperate the working conveying device with the drive device and the transmission device and configured to latch the working conveying device with the drive device and move the work conveying device when the drive device is moved in one direction in the reciprocating direction.

The present application is based on and claims priorities from Japanese application Nos. 2005-255226, filed on Sep. 2, 2005, and 2006-27464, filed on Feb. 3, 2006, the disclosures of which are hereby incorporated by reference herein in their entirety.

BRIEF DESCRIPTION OF THE DRAWINGS

FIG. 9A is a view illustrating a concept when an unprocessed copying machine as a work is included in the transmission module.

FIG. 9B is a view illustrating a state that an interval is adjusted at a predetermined carry-in interval when an unprocessed copying machine is included.

FIG. 9C is an explanation view showing a concept an interval between carriages is differently adjusted when an unprocessed copying machine is included.

FIG. 21A is a cross section view in a longitudinal direction of a duct and trolley according to a third embodiment.

FIG. 21B is an explanation view when a code detection sensor comprises a micro switch.

FIG. 24 is a block diagram of a control circuit to be disposed in the trolley of FIG. 21A.

FIG. 25 is a block diagram of another control circuit to be disposed in the trolley of FIG. 21A.

DETAILED DESCRIPTION OF THE PREFERRED EMBODIMENTS

Hereinafter, a work conveying apparatus and a work manufacturing method according to embodiments of the present invention will be explained with reference to the accompanying drawings.

First Embodiment

Figure 1:
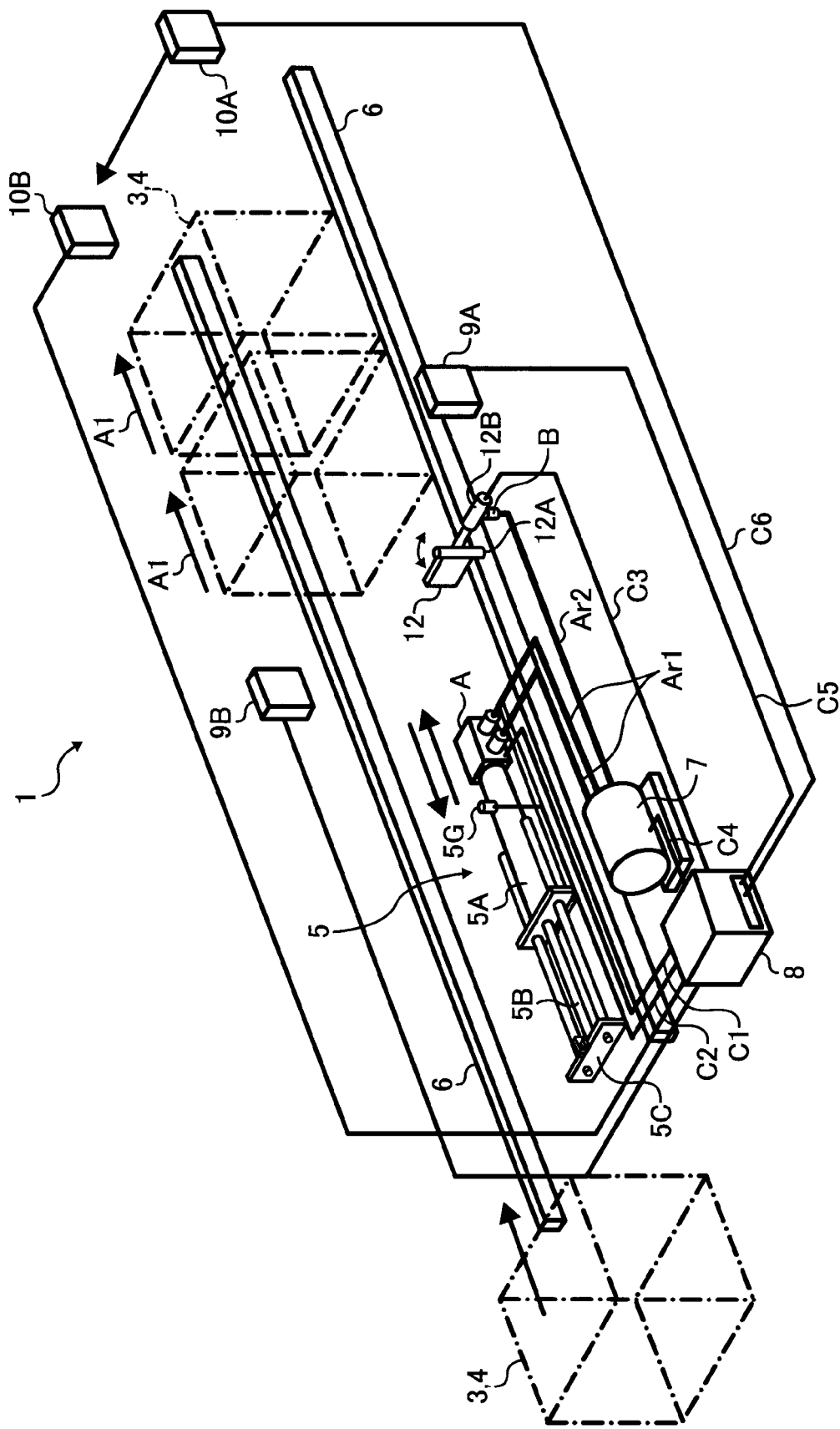
FIG. 1 is a schematic diagram showing a work conveying apparatus according to an embodiment of the present invention.
Figure 2:
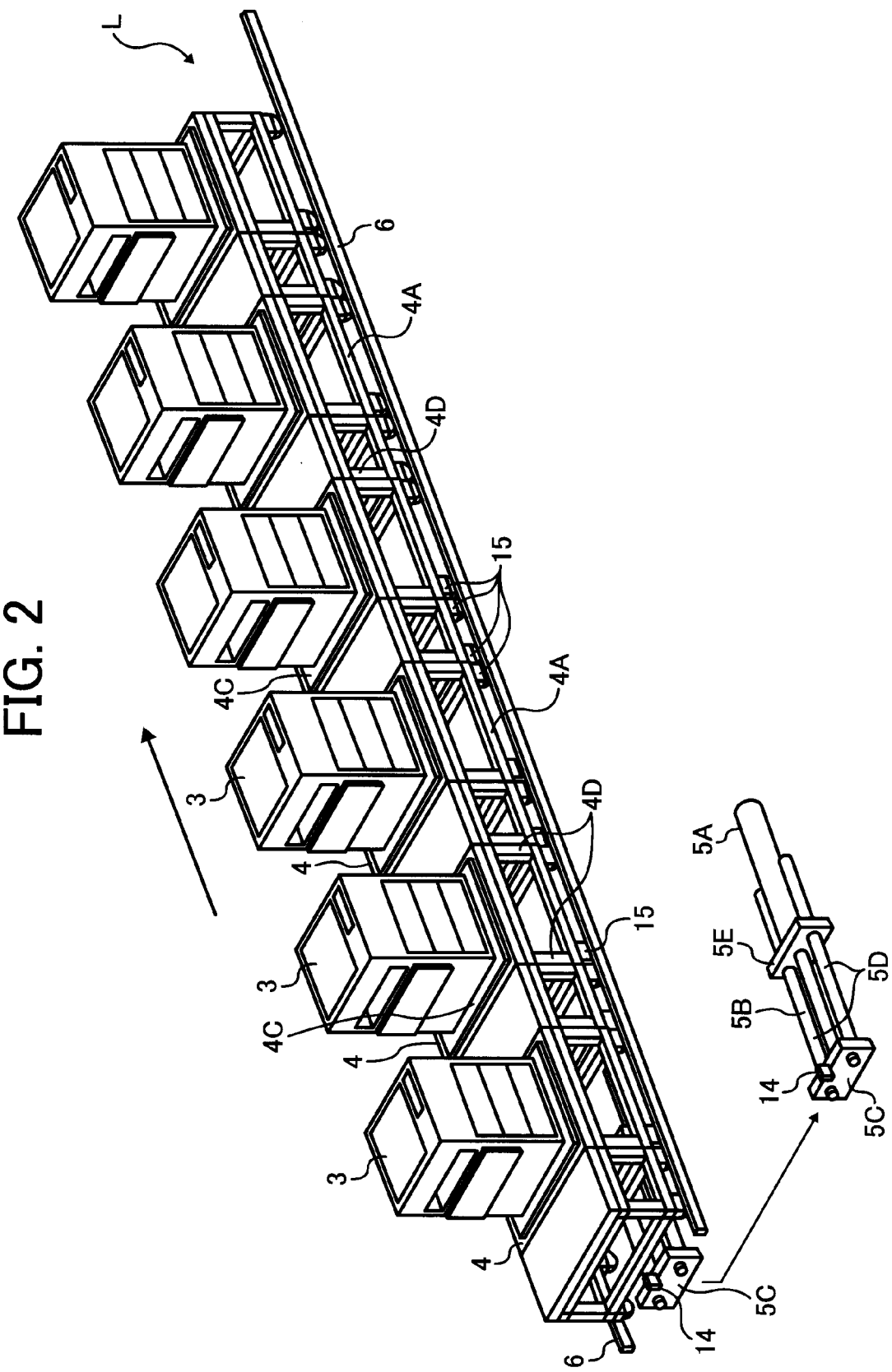
FIG. 2 is a schematic diagram showing a condition, which conveys a carriage and copying machine by using the work conveying apparatus in FIG. 1.

FIGS. 1, 2 are schematic diagrams of a work conveying apparatus according to the first embodiment of the present invention. In this work conveying apparatus 1, a reference number 2 denotes a floor, 3 denotes a copying machine of an image forming device as a work, 4 denotes a carriage as a work conveying device, which conveys the copying machine 3, 6 denotes an air cylinder as a driving device, 6 denotes a guide rail, which guides the carriage 4, 7 denotes an air compressor, 8 denotes a control device, which controls the air cylinder 5, air compressor 7, etc., 9A, 9B denote carry-in side carriage sensors, which detect the carry-in of the carriage 4, 10A, 10B denote carry-out side carriage sensors, which detect the carry-out of the carriage 4, and 12 denotes a door as a buffering device, which receives the carriage 4.

In the examples shown in FIGS. 1, 2, either side of the guide rails 6 is fastened onto the floor 2 by a pair of bolts, etc. A pair of the guide rails 6 comprises a conveying path L of assembly line where the assembly of the copying machine 3 is conducted. The work conveying apparatus 1 comprises the carriage 4, which carries the copying machine 3, the air cylinder 5, which is reciprocable in a predetermined direction, and a one-way clutch 14, which is installed in a piston rod 5B of the air cylinder 5. The work conveying apparatus 1 tack-conveys the carriage 4 in a predetermined direction by the intermittent reciprocating movement of the piston rod 5B.

A cylinder tube 5A of the air cylinder 5 is fastened onto the floor 2 such that the piston rod 5B faces the end portion side of the conveying path L. In addition, if the air cylinder 5 is fastened onto a base having wheels, and the base side is fastened onto the floor 2 by means of a bolt, etc., the setting place of the air cylinder 5 can be easily changed. The air cylinder 5 shown in FIG. 1 represents a type, which pushes the carriage 4 along the guide rails 6, 6. If the piston rod 5 constricts, the carriage 4 moves at the contraction of the piston rod 513 from the carriage sensors 9A, 9B to the carry-out side carriage sensors 10A, 10A.

A driving plate 5C is fixed to the leading end portion of the piston rod 5B. The one-way clutch 14 as a latching portion is attached to the upper portion of the driving plate 5C. The one-way clutch 14 can be referred to as a one-way pawl or latch pawl, and latches with the carriage 4 only when the piston rod 5B moves to one direction of the reciprocating direction. In this example, the one-way clutch 14 catches on a receiving metal 4B of a lower portion frame 4A of the carriage 4 when the piston rod 5B moves to the contraction direction.

Figure 3:
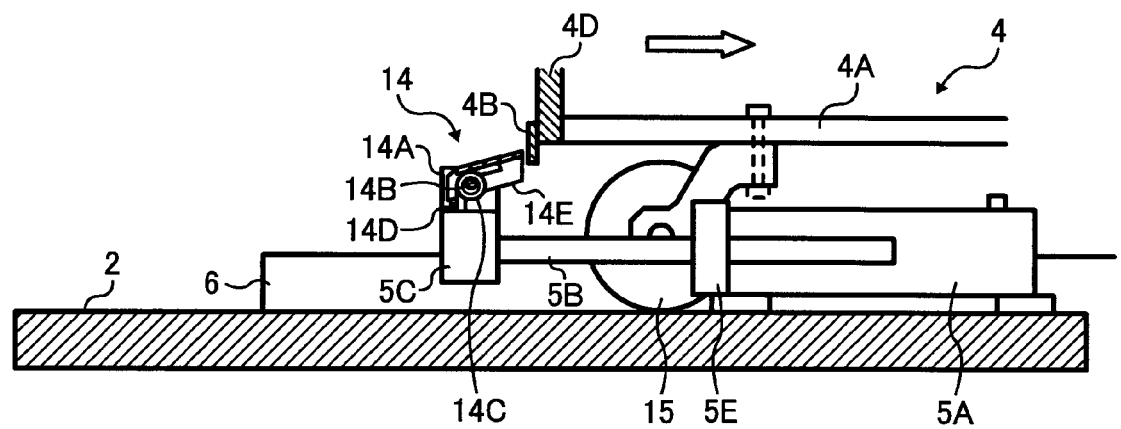
FIG. 3 is a structural view illustrating an attachment state of an air cylinder and one-way clutch used in FIGS. 1, 2.

FIG. 3 illustrates the structure of the one-way clutch 14. Each side of the driving plate 5C is provided with a guide rod 5D, 5D. The guide rod 5D, 5D freely slides a guide hole of a guide plate 5E fixed to the cylinder tube 5A.

The one-way clutch 14 is mounted on a pair of supporting plates 14A fastened to the driving plate 5C. The supporting plate 14A comprises a U-shaped steel plate, and is disposed in the top face of the driving plate 5C. The supporting plate 14A is provided with a mounting shaft 14B. The one-way clutch 14 is rotatably supported by the mounting shaft 14B. The mounting shaft 14B rotatably supports one end portion side of the one-way clutch 14, and the other end portion of the one-way clutch 14 is rotatable. The end portion of the side that the one-way clutch 14 rotates latches with the lower portion frame 4A of the carriage 4. In this example, the receiving metal 4B is fixed to the lower portion frame 4A, and the one-way clutch 14 latches with the receiving metal 4B. The mounting shaft 14B is provided with a coil spring 14C, and one end of the coil spring 14C is hitting the U-shaped bottom portion of the one-way clutch 14C formed in the reversed U-shape. In addition, the other end of the coil spring 14C is hitting a projection 14D of the supporting plate 14A, and a long side portion 14E of the one-way clutch 14 is biased upwardly.

Figure 4:
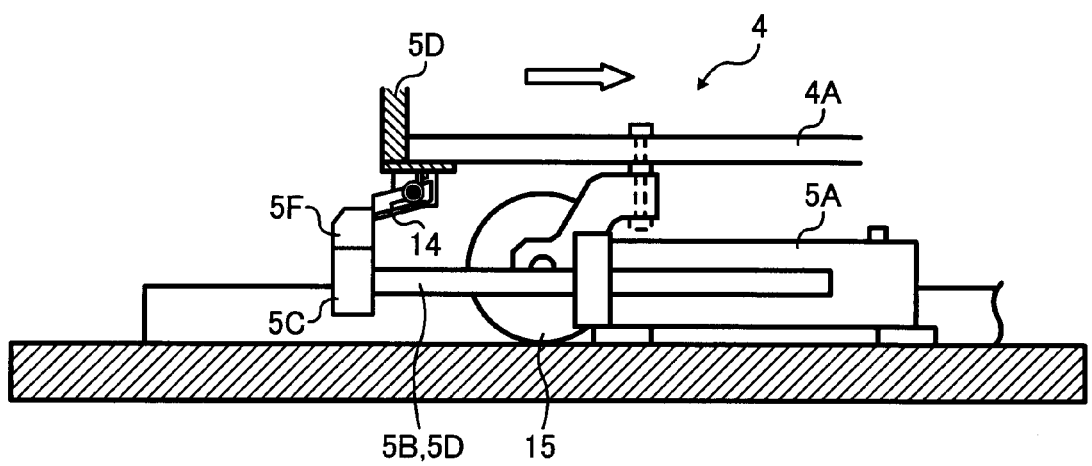
FIG. 4 is a structural view showing a state that the one-way clutch in FIGS. 1, 2 is disposed in the carriage side.

As shown in FIG. 4, the one-way clutch 14 can be mounted on the lower portion frame 4A side of the carriage 4. In the example shown in FIG. 4, only a receiving plate metal 5F is mounted on the driving plate 5C of the piston rod 5B.

Figure 8:
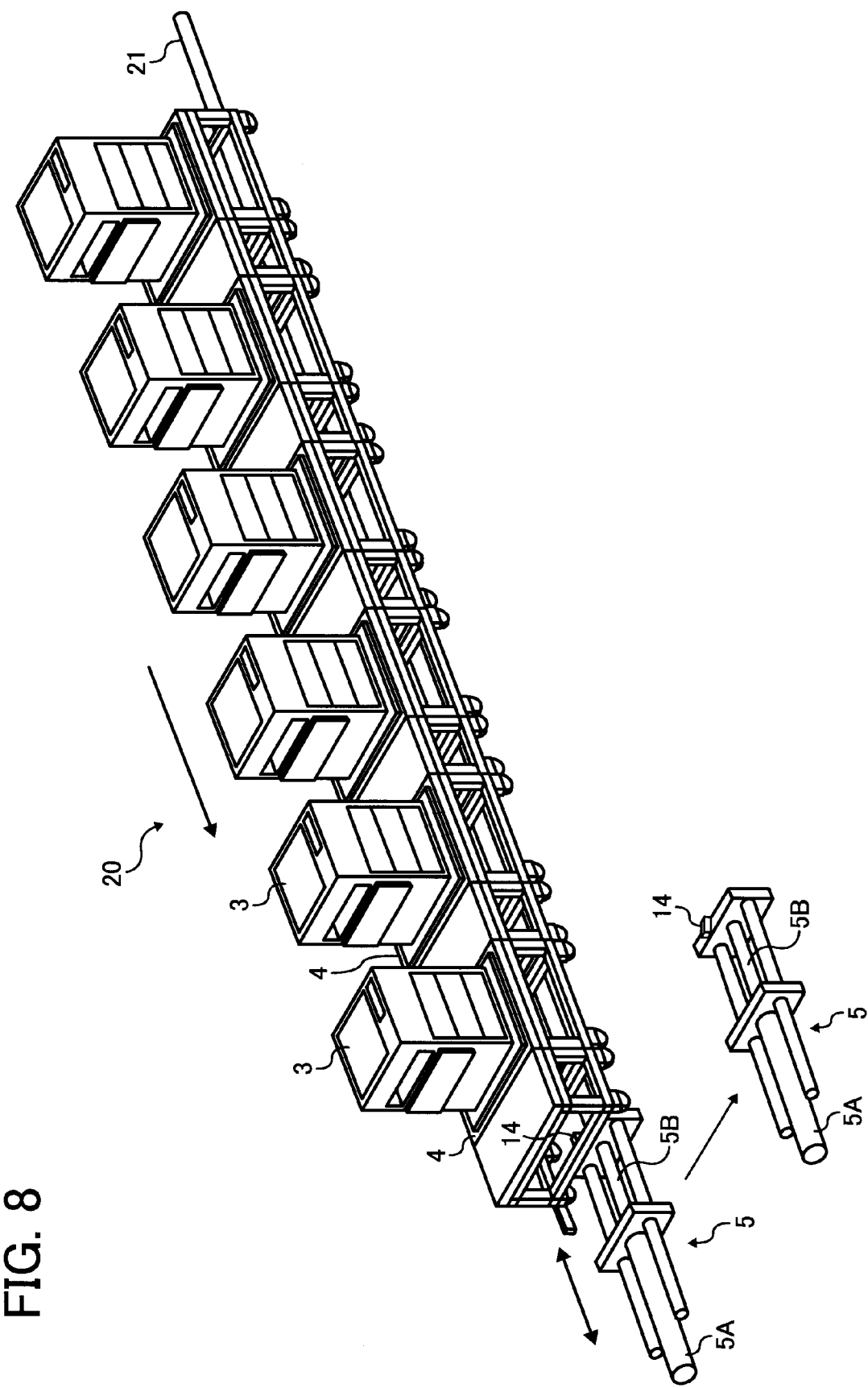
FIG. 8 is a perspective view of a work conveying apparatus that a transmission module is coupled to a piston rod of an air cylinder.
Figure 10:
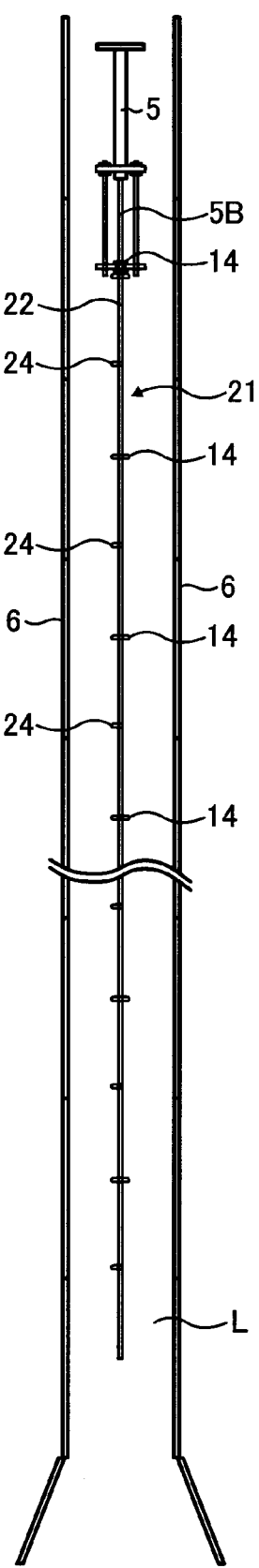
FIG. 10 is an explanation view showing the concept of the work conveying apparatus in FIG. 8.
Figure 11:
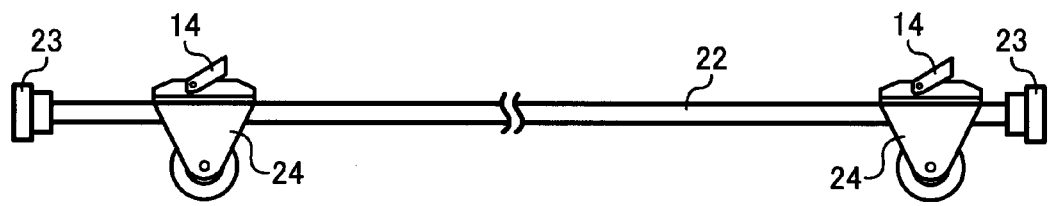
FIG. 11 is an explanation view showing a pipe module comprising the transmission module in FIG. 8.

Moreover, in each of the one-way clutches 14 shown in FIGS. 8, 4, if the one-way clutch 14 is disposed rotatably in the vertical shaft direction so as to change the direction in the conveying path L of the one-way clutch 14, and if the one-way clutch 14 is previously attached to an attachment plate, etc., such that the attachment plate unit in which the one-way clutch 14 is attached becomes exchangeable, the direction of the one-way clutch 14 can be easily changed when changing the conveying path. The unit of the one-way clutch 14 can be detachable to the carriage 4 side, or detachable to the driving plate 5C side of the piston rod 5B.

The guide rail 6 shown in FIG. 1 is coupled and is formed long the conveying path L. The length of each of the guide rails 6 before being coupled is set according to the reciprocating distance of the piston rod 5B. The reciprocating distance of the piston rod 5B is nearly set according to the distance of the conveying direction of the carriage 4. The carriage 4 can be fed to the conveying direction once (arrow A1 direction in FIG. 1) by one reciprocating of the piston rod 5.

The upstream side of the conveying path L in the guide rail 6 is provided with a carry-in entrance, which carries the carriage 4 in the conveying path L. The carry-in entrance is one end portions of a pair of guide rails 6, 6, and is in the vicinity of the work carry-in entrance, and also the door 12 is disposed in the backside of the air cylinder 5. The door 12 is mounted on a mounting shaft 12A, so as to extend in the vertical direction with respect to the mounting shaft 12A extending in the vertical direction. The door 12 is opened and closed by an air cylinder for opening and closing of a door 12B. In addition, since the extended piston rod 5B is disposed to be covered by the guide rails 6, 6, the tripping of the worker while at work can be prevented.

The back end portion of the cylinder tube 5A of the air cylinder 5 is provided with a relief valve 5G and a control valve A. The relief valve 5G can be opened by the control device 8. If the control device 8 receives an emergency signal from a sensor (not shown, for example, an impact detection sensor, human body detection sensor, etc.), the control device 8 opens the relief valve 8 to stops the operation of the piston rod 5B.

The control valve A comprises a three-way valve, and is connected to the air compressor 7. The control device 8 is electrically connected to the control valve A. The control valve A controls the expansion and contraction of the piston rod 5B by supplying compressed air to the cylinder tube 5A and discharging the air from the cylinder tube 5A. In addition, the control device 8 can control the expansion and contraction time of the piston rod 5B and can change the tact time of work.

An air cylinder for opening and closing of a door 12A is connected to the air compressor 7. The air cylinder 12A is provided with a control valve B comprising a three-way valve. The control valve B controls the opening and closing of the door 12 by the control device 8. Reference number Ar1 denotes an air path, and also Ar2 denotes an air path.

The carriage 4 comprises a rectangular solid shape in which pope members are built up by connecting tubes to be fixed. The carriage 4 comprises the lower portion frame 4A (base portion) that the one-way clutch 14 is latched, and a work carrying portion 4C which carries the copying machine 3. A column support 4D between the lower portion frame 4A and the work carrying portion 4C is adopted to be a height adjusting device having a height adjusting function.

The carriage 4 comprises a caster 15. The height of the lower portion frame 4A of the carriage 4 is set higher than the upper end portion of the air cylinder 5 of driving device. In order to ensure this height, a relatively large-scaled wheel of the caster 15 and a large-scaled bearing of the caster 15 are used. Moreover, those wheel and bearing are made of hard plastic having hardness which is inflexible, deformable, and unbreakable when the copying machine 3 is placed, and also does not scratch the floor. This hard plastic includes nylon and olefin series having hardness and wear resistance. In addition, the outer circumference portion of the wheel can be made of hard plastic and the inner portion can be made of a metal plate.

In order to lower the height of the air cylinder 5, the air cylinder 5 having a reduced diameter can be selected, and the air cylinder 5 can be disposed and fixed to the floor 2 in the carry-in entrance of and of the carry-out exist of the conveying path L, respectively, or can be disposed in the conveying path L in parallel.

Figure 5:
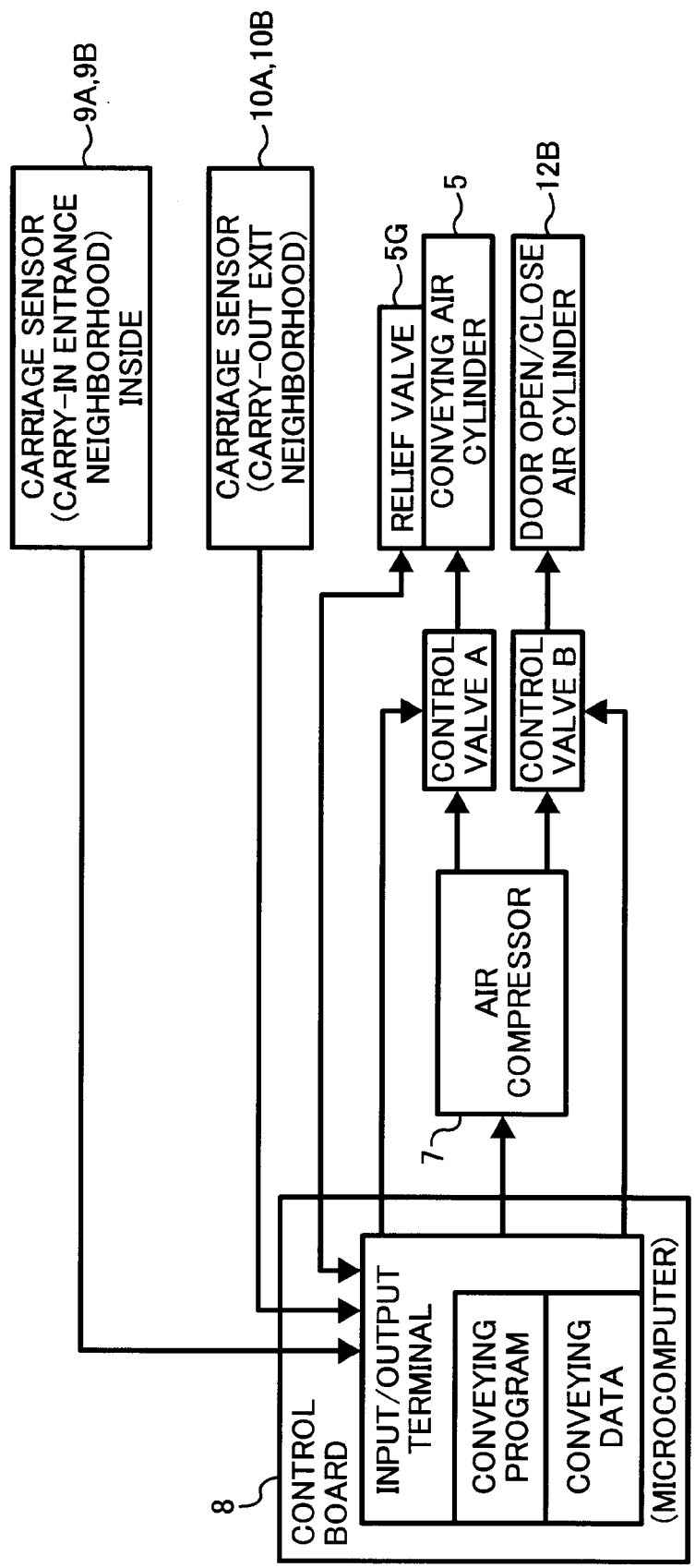
FIG. 5 is a block diagram of a control circuit in FIGS. 1, 2.

FIG. 5 shows a block circuit diagram of a control circuit to be connected to a control substrate of the control device 8. More particular, at least a conveying program for conveying processing, which conveys the copying machine 3 while assembling the copying machine 3, and conveying data comprising a tact time, etc., required for conveying are stored in the ROM area of the microcomputer of the control substrate, and the conveying processing can be conducted with the activation of the conveying program. The input-output terminal of the microcomputer is connected with a signal line C4, which controls the air compressor 7, signal lines C1, C3, which control the control valves A, B, a signal line C2, which controls the relief valve 5G, and signal lines C5, C6 from the carriage sensors 9A, 9B, 10A, 10B.

Figure 6:
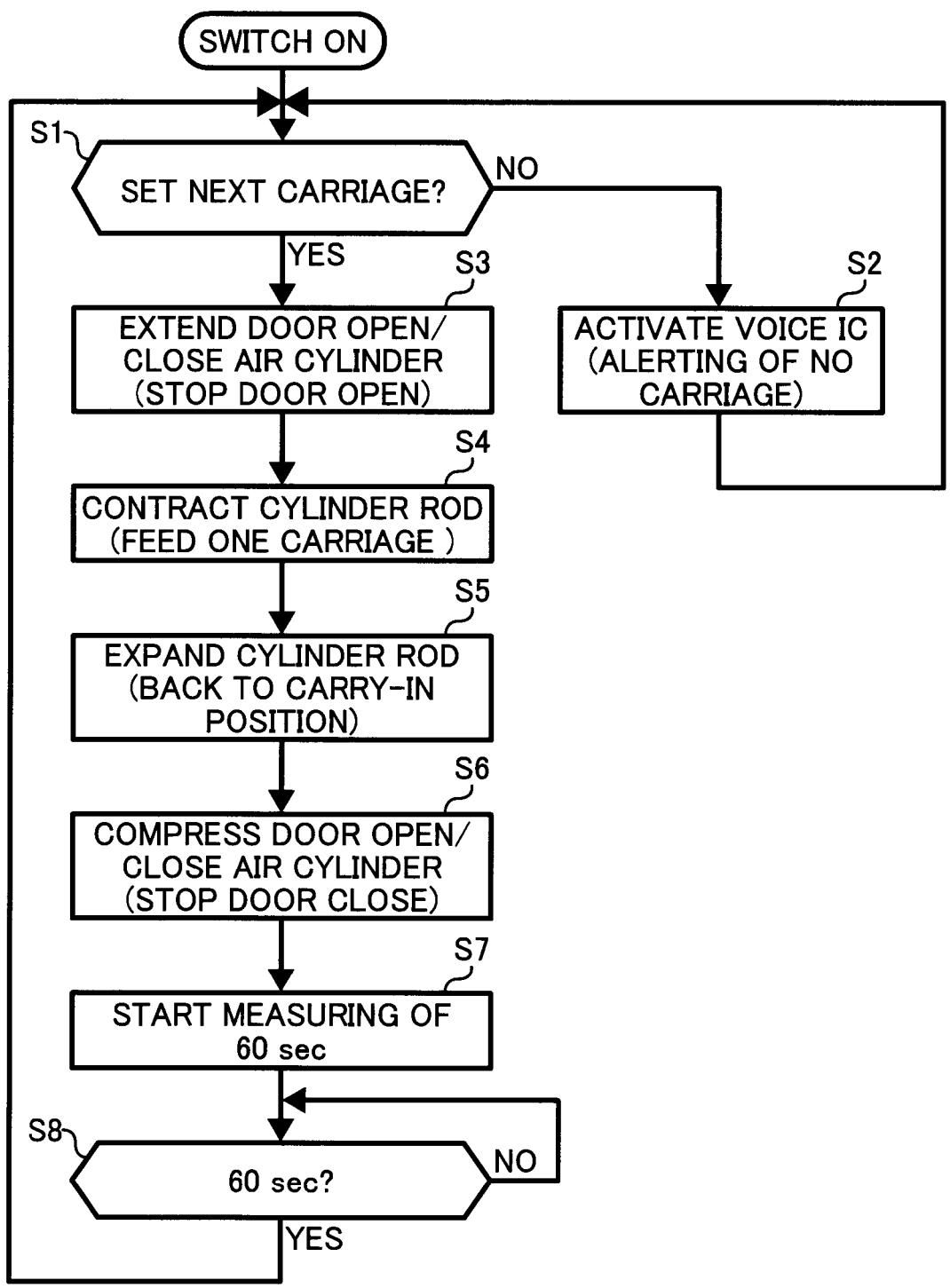
FIG. 6 is a flow chart showing the operation of the control circuit in FIGS. 1, 2.

FIG. 6 shows the operation of the work conveying apparatus 1. If the main switch of the work conveying apparatus 1 is turned on, the carriage sensors 9A, 9B determines whether or not the carriage 4 is in the conveying path L (step S1). In this determination, if the carriage 4 does not exist between the sensors 9A, 9B, the message that the carriage. 4 does not exist is informed by a voice IC, buzzer, etc., of the control circuit (not shown) (step S2).

If the sensors 9A, 9B detects that the carriage 4 exists in the carry-in entrance in the determination at step S1, the air is supplied to the air cylinder for opening and closing of a door 12A from the air compressor 7 by the control valve B, and the carriage 4 is allowed to enter into the conveying path L by opening the door 12 (step S3). If the carry-in of the carriage 4 is finished, the piston rod 5B is constricted by controlling the control valve A of the air cylinder 5. Thereby the carriage 4 is carried in the conveying path L (step S4). If the carry-in of the carriage 4 is completed, the piston rod 5B is expanded to be set back in a controlling position by controlling the control valve A (step S5). If the piston rod 5B is set back to the waiting position, the air is absorbed to the air cylinder for opening and closing of a door 12A from the air compressor 7 by the control valve B, and the entrance of the carriage 4 into the conveying path L is blocked by closing the door 12 (step S6). After prohibiting the carry-in of the carriage 4, the measurement of the tact time of 60 seconds is started (step S7), if 60 seconds have been passed (step S8), the flow goes back to step S1 again.

Accordingly, the carriage 4 can be carried in the conveying path L. Also, it is possible to prevent that the carriage 4 to be carried in the conveying path L crashes the carriage 4 already carried in the back side of the door 12, and it is also possible to prevent the line from stopping by detecting an abnormal value resulting in the impact in the conveying path L.

In addition, the carriage sensors 9A, 9B, 10A, 10B comprise optical sensors, and detect the work by shielding the light emitted from the light emitting element with the carriage 4 or the copying machine 3. The carriage sensors 10A, 10B are disposed in the carry-out exist sides of the conveying path L, and can detect the status of the conveying operation by measuring the number of conveyed works.

If a part conveying carriage 15 is coupled between the two carriages 4 by means of a connecting device such as a hook, join, etc., the carriage 4, which carries a predetermined copying machine 3 and the specific part conveying carriage 15 of the copying machine 3 are not separated. Thereby, the parts, special tools, etc., are easily collected and prepared. Therefore, the finding and mixing-up of the parts, special tools, etc., while at assembly can be prevented, and the waste of working hours can be reduced.

Figure 7:
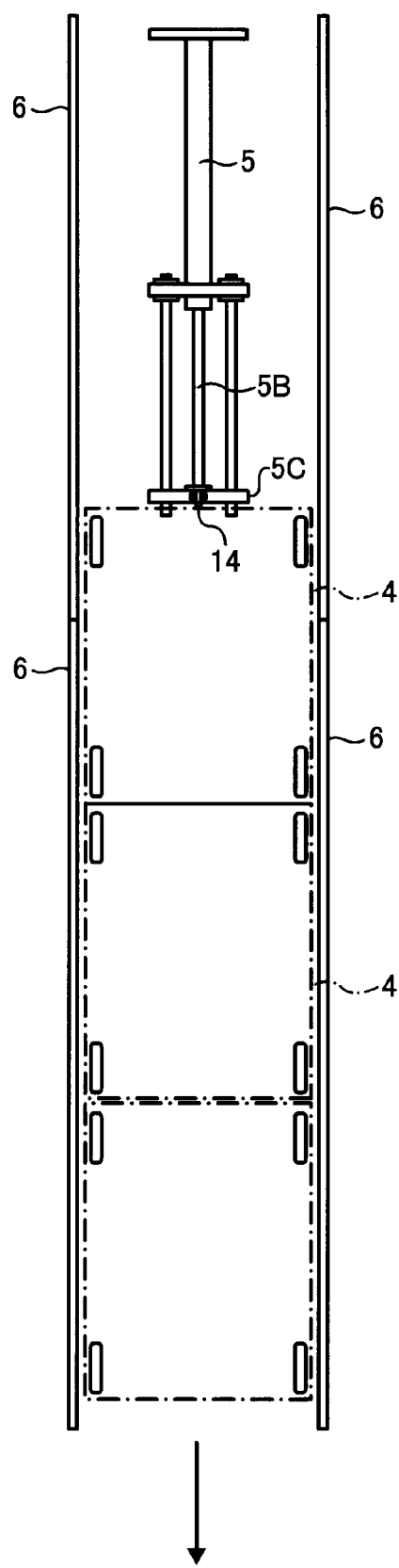
FIG. 7 is a view explaining a form, which conveys a carriage in a guide rail by pushing the carriage by an air cylinder.

FIG. 7 is a view illustrating that the piston rod 5B of the air cylinder 5 is arranged toward the inner side of the conveying path L. If the air cylinder 5 is arranged as just described, the carriage 4 can be carried between the guide rails 6, 6 and a plurality of coupled carriages 4 can be conveying by installing the one-way clutch 14 on the upper portion of the driving plate 5.

FIG. 8 is a view illustrating that the air cylinder 5 installed in the carry-out exist side of the conveying path L. A work conveying apparatus 20 in FIG. 8 is coupled with a transmission module 21 as a transmission device, which transmits the power to the piston rod 5B of the air cylinder 5, and is configured to convey the carriage 4 by pulling the carriage 4 of the work conveying device in the conveying path L. More particular, in the work conveying apparatus shown in FIG. 2, the carriage 4 is conveyed by pushing the carriage 4 without using the transmission module 21. However, in the work conveying apparatus 20 shown in FIG. 8, the distant carriage 4 latches with the one-way clutch 14 of the transmission module 21 by using the transmission module 21, and is conveyed by intermittently pulling the carriage 4 in the air cylinder 5 side with the expansion and contraction of the piston rod 5B.

Figure 12:
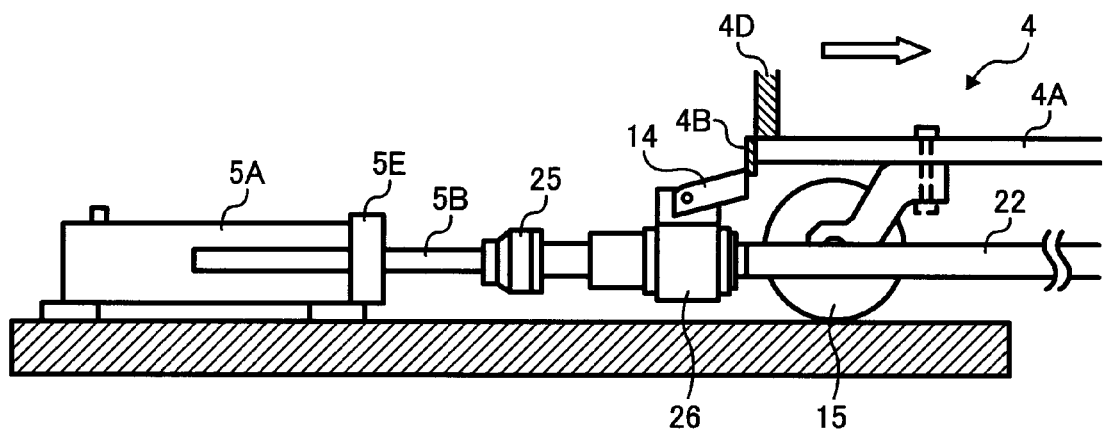
FIG. 12 is an explanation view showing the work conveying apparatus in FIGS. 7, 8 that the one-way clutch is provided in the transmission module.

The transmission module 21 comprises one conveying path to which a plurality of pipe modules 22 is coupled. The length of one pipe module 22 is set corresponding to the reciprocating distance of the carriage 4. Each of the pipe modules 22 has joint portions 23 (coupling device) on the both end portions. Each of the joint end portions has a hole of bolt on the flange for coupling. The caster portion 24 and one-way clutch 14 are attached to the intermediate portion of the pipe module 22. The installation interval of the one-way clutch 14 is set in accordance with the entire length of the conveying direction of the carriage 4. FIG. 12 shows the coupling state of the piston rod 5B and the pipe module 22. The leading end portion of the piston rod 5B is provided with a joint portion 25 on the leading end portion. The joint portion 25 is formed with a hole of bolt on the flange, and can be coupled to the pipe module 22 by a bolt nut. An installation portion 26 of the one-way clutch 14 is formed in the vicinity of the joint portion 25 of the pipe module 22. The one-way clutch 14 is installed in the upper portion of this installation potion 26. The one-way clutch 14 is installed in the installation portion 26, but the installation position of the one-way clutch 14 is not limited thereto. The one-way clutch 14 can be mounted on the pipe module 22 as long as the one-way clutch can be latched in the conveying direction.

The height of the upper end portion of the pipe module 22 comprising the transmission module 21 is set that the height from the grounding portion of the caster portion 24 to the one-way clutch 14 can latch with the receiving metal 4B, and also the one-way clutch 14 can hit only the receiving metal 4B to pull the carriage 4.

Figure 13:
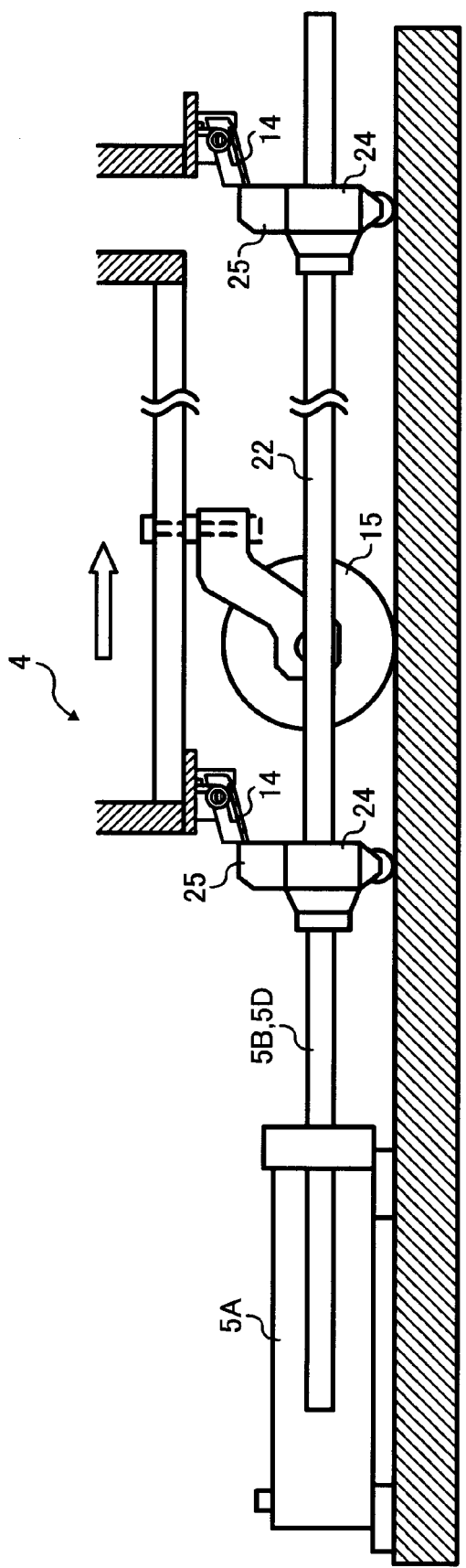
FIG. 13 is an explanation view showing the work conveying apparatus in FIGS. 7, 8 that the one-way clutch is provided in the carriage side.

FIG. 13 shows a view that the one-way clutch 14 is provided in the lower portion frame 4A side of the carriage, and a plurality of pipe modules 22 is coupled in the leading end portion of the piston rod 5B of the air cylinder 5. According to such a structure, a holding plate metal 25 is installed in the caster portion 24 of the pipe module 22, and the one-way clutch 24 latches with the holding plate metal 25. Accordingly, the carriage 4 can be intermittently conveyed in the arrow direction A2 in FIG. 13.

The height of the upper end portion of the pipe module 22 comprising the transmission module 21 is set that the height from the grounding portion of the caster portion 24 to the holding plate metal 25 can latch the one-way clutch 14, and also the height the one-way clutch 14 can hit only the holding plate metal 25 to pull the carriage 4.

As described above, since the work conveying apparatus 1, 20 of the first embodiment is provided with the carriage 4 which carries the copying machine 3, the air cylinder 5 capable of reciprocating in a predetermined direction at a predetermined distance, the transmission module 21, which is coupled to the air cylinder 5 to form the conveying path L, and the one-way clutch 14 as a latching portion disposed in the transmission module 21 or the carriage 4, the carriage 4 can be intermittently conveyed in one direction. Moreover, the driving device comprises the air cylinder 5; thus, the energy can be saved regardless of large power while at the conveying.

Since the transmission module 21 comprises a plurality of pipe modules 22 coupled each other, the conveying distance can be freely set in accordance with the length of the conveying path. In addition, since the length of the pipe module 22 is set at integral multiple of the conveying distance of the carriage 4 if the reciprocating distance of the piston rod 5B of the air cylinder 5, the length of the conveying path can be easily set. Moreover, since the transmission module 21 functions as the guiding device of the carriage 4, if the transmission module 21 is adopted, the guide rail 6 is not required. Accordingly, the cost of installing equipment can be reduced. Of course, the guide rail 6 can be disposed. In addition, the guide can be disposed to prevent meandering of the transmission module 21.

If the installation position of the one-way clutch 14 to be installed in the transmission module 21 can be changed, the locking position of the carriage 4 can be changed in accordance with the size of the carriage 4 and the reciprocating distance of the piston rod 5B.

Moreover, the air cylinder 5 is used for the driving device, but a hydraulic cylinder or a liner motor capable of moving in a predetermined direction can be used for the driving device.

Furthermore, in a work manufacturing method using the above work conveying apparatus 1, 20, when the piston rod 5 of the air cylinder 5 or the transmission module 21 reciprocates, and also movies in one direction of the reciprocating movement, the carriage 4 and the piston load 5B or the transmission module are latched by the one-way clutch 14; thereby, the carriage 4 intermittently moves. If the transmission module 21 is used, a plurality of carriages 4 can be conveyed while pulling the carriages by latching a plurality of carriages with the transmission module 21. If conveying only with the piston rod 5B, a plurality of carriages 4 is intermittently moved along the guide rails 6, while pushing a plurality of carriages 4. Therefore, while this intermittent operation of the carriage 4 is stopped, the copying machine 3 as a work can be assembled, and predetermined assembly operation can be promoted within a predetermined time.

The transmission module 21 shown in FIG. 8 can be used in a production process such as an assembling process. In this case, a condition that the carriages which carry the copying machines 3 are stuck is prevented by appropriately adjusting the time interval, which carries the copying machine 3 as a work in one operation line, and the speed, which operates the transmission module 21. Accordingly, the works in progress can reduce the number of unprocessed copying machines 3.

More particularly, even if about one or two unprocessed copying machine 3 is fortuitously included in one work line, the delay can be solved if a worker smoothly handles the copying machine 3. However, as shown in FIG. 9A, the unprocessed copying machines 3 are frequently included, the essed copying machines 3 in the line tend to fall behind. reduction of the processing time is limited, and the unproc- Therefore, if the unprocessed copying machines. 3 are frequently included, the interval, which carries a new copying machine in the work line, is extended, the carry-in of new copying machine 3 is temporarily stopped, and the number of copying machines 3, which should be processed in a predetermined time T, is reduced, as shown in FIGS. 9B and 9C, so as to conduct the adjustment. This adjustment is performed by adjusting the supply of the compressed air to the cylinder tube 5A of the air cylinder 5. More particularly, as shown in FIG. 9B, the expansion and contraction time of the piston rod 5B is controlled by adjusting the supply and displacement of the compressed air to the cylinder tube 5A with by the control signal of the control device 8 to control.

For example, the number of copying machines $3q$ existing in one work line becomes difference (A1–A2) between the number of counters A1 detected by the carriage sensors 9A, 9B of the carry-in side (reference to FIG. 1) and the number of counters A2 detected by the carriage sensors 10A, 10B of the carry-out side. Therefore, it can be determined whether or not the unprocessed copying machine 3 is included in one work line by the comparison between the number of copying machines $3q$ in the line ($q=A1-A2$) and the number of processable copying machines $3n$ in a predetermined time T. If it is $q<n$, the carriage 4 is not stuck, if it is $q>n$, it can be assumed that the carriage 4 is stuck.

The number of processable copying machine $3n$ in a predetermined time T may be different depending on a worker. In this case, the number of processable copying machine $3n$ is adjusted depending on a worker, the time interval, which carries the carriage 4 having the copying machine 3 in the line, is changed (reference to FIG. 9C), the conveying speed of the carriage 4 having the copying machine 3 in the line can be decreased, and the reciprocating speed and the stroke of the air cylinder 5 are adjusted so as to reduce the conveying distance of one carriage 4.

Accordingly, the number of unprocessed works can be reduced, and it is also possible to prevent that the carriage 4, which carries the unprocessed copying machine 3, stays in the vicinity of the tail end of the conveying place of the work conveying apparatus 1, 20. On the other hand, if the vacancy of carriage is included in the line, a new carriage is carried in an empty space after the vacancy has been moved over, and the maximum number of carriages is carried in depending on the ability of worker in the line.

As described above, the number of works A1 carried in one work line and the number of works A2 carried out the work line are measured, the difference between A1 and A2 is calculated to define the number of already carried in works existing in one line, and the number of already carried-in works is compared with the appropriate number of processing works which should exist in one line. In this comparison, if the processing task of the work smoothly proceeds, the difference between A1 and A2 becomes the appropriate number of processing works or less, and if an unprocessed work is included, the difference between A1 and A2 becomes larger than the appropriately processing number; thus, the status of the processing of work can be obtained.

If the status of the processing of work can be obtained, the accumulation of unprocessed works, the stop of the line and the like can be prevented by adjusting the time interval which carries in the work. In addition, if the accumulation and moving speed of the work are abnormal, the triggers of the defects of work and worker, the defects of installation, etc., can be assumed. Accordingly, measurements to those triggers can be taken as quickly as possible.

On the other hand, if the number of works in one work line lowers the appropriate number of works, the number of works, which is carried in, can be increased to improve the working efficiency. If the working efficiency is different based on a time such that high working efficiency is obtained for the afternoon although low working efficiency is obtained for the morning, for example, the carry-in time of the work can be slowed when the low working efficiency is obtained, and the carry-in time of work can be shortened when the high working efficiency is obtained. Thereby, the smooth work process operation can be achieved as a total of one day, and the factor of low working efficiency can be analyzed by recording the processing result. As described above, the carry-in of the work can be adjusted in accordance with the physical condition and working status of the worker by constantly comparing the number of already carried-in works and an appropriate number. Thus, the overall manufacturing efficiency can be improved.

Second Embodiment

Figure 14:
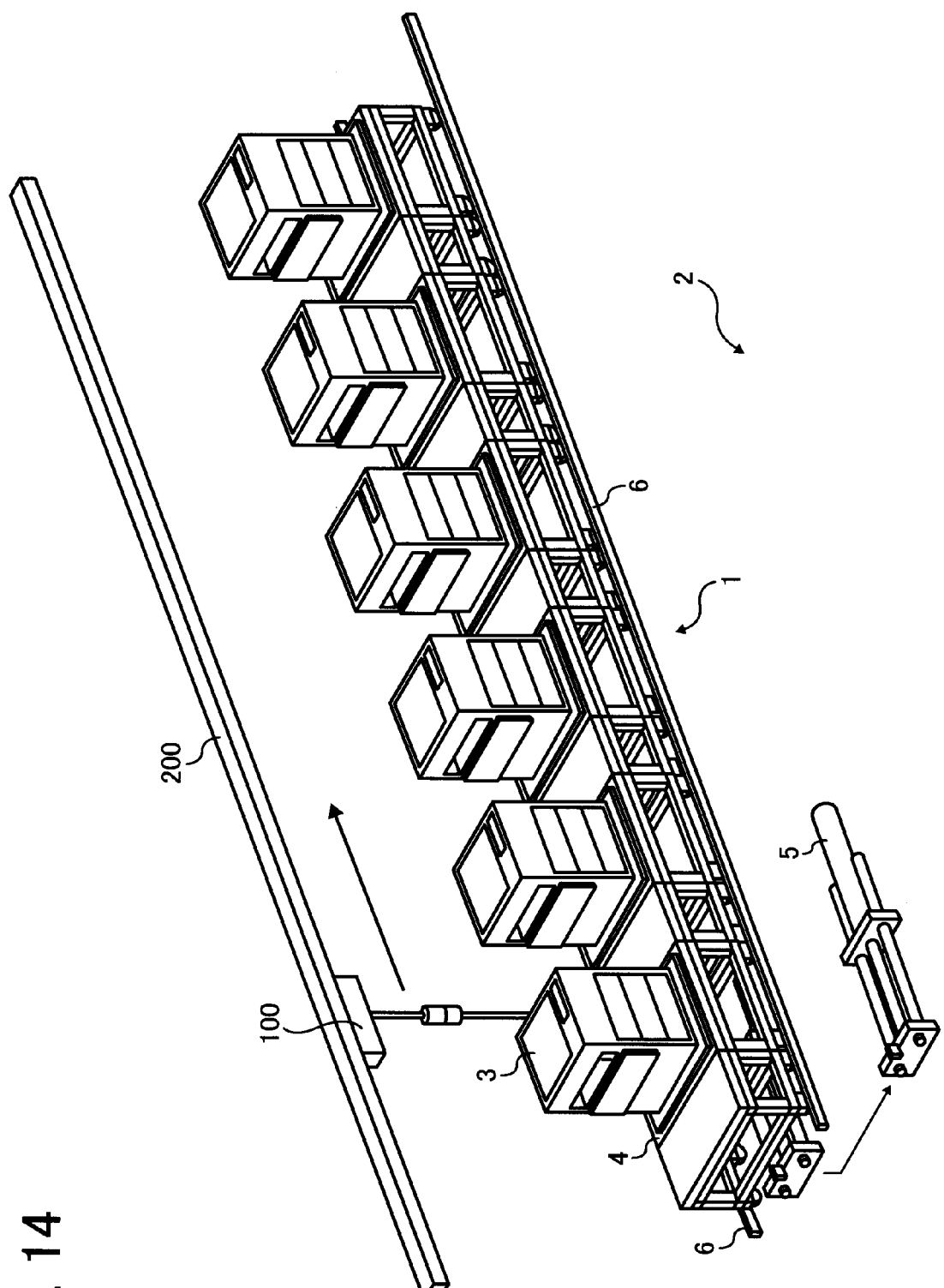
FIG. 14 is a perspective view of a work conveying apparatus according to the second embodiment of the present invention, and showing a state that a duct for feeding and a trolley are disposed in the upper portion of the moving area of the carriage.
Figure 15:
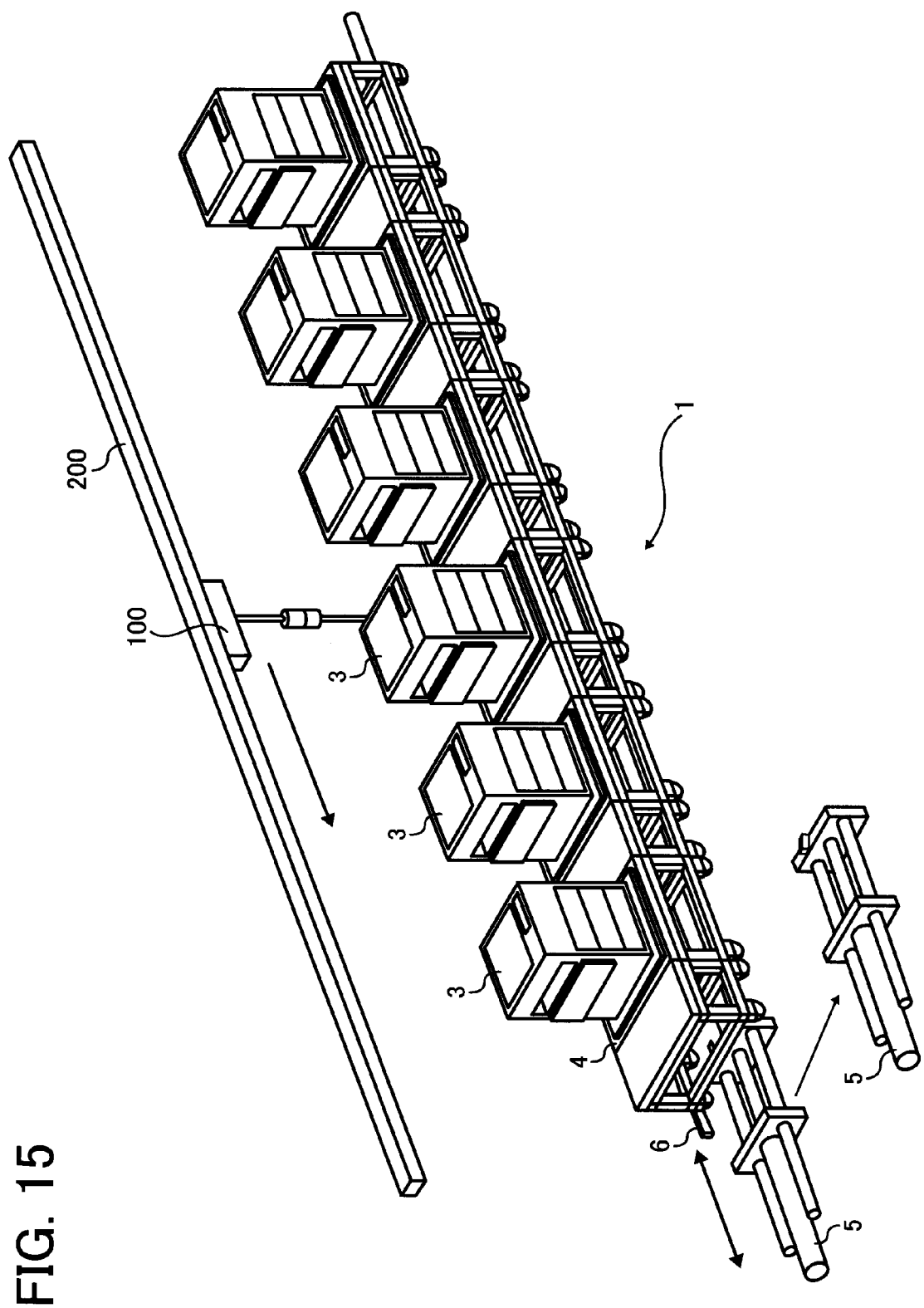
FIG. 15 is a perspective view showing a state that the disposing direction of the air cylinder of the work conveying apparatus is reversely disposed.

Next, a second embodiment that power feeding equipment and a power feeding device are disposed on the upper side of the work conveying apparatus of the first embodiment. FIG. 14 shows a work conveying apparatus according to the second embodiment of the present invention. In the second embodiment, the power feeding equipment and the power feeding device are disposed in a ceiling portion positioned in the upper portion of the conveying area of the above mentioned work conveying device 1 or in the vicinity of the ceiling portion. A duct 200 as the power feeding equipment is equipped in the ceiling portion of the upper portion of the work conveying apparatus 1. The duct 200 is provided with an indoor electric wire, which supplies industrial alternating electric current.

Figure 16:
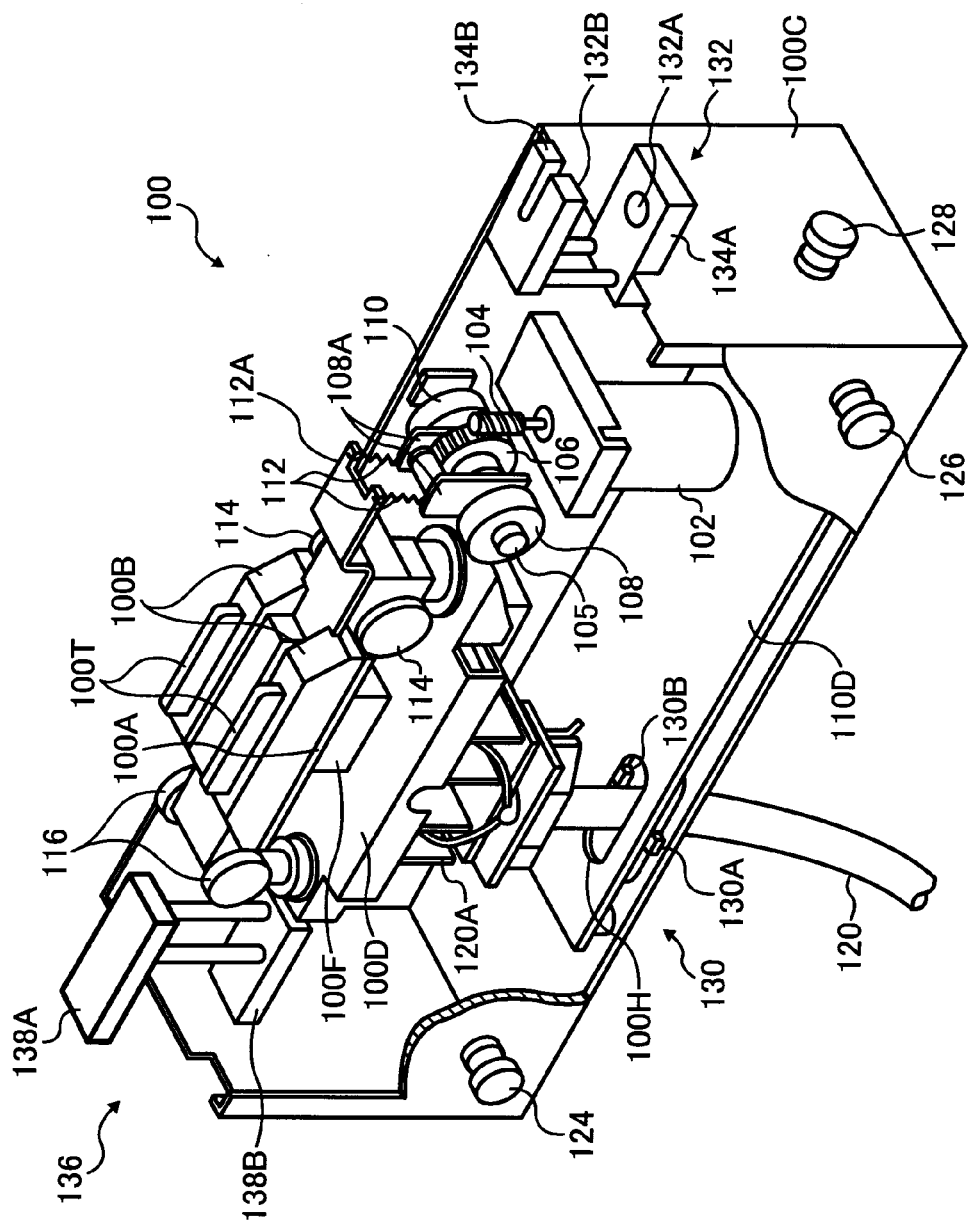
FIG. 16 is a perspective view showing the mechanism of the trolley in FIGS. 14, 15.
Figure 17:
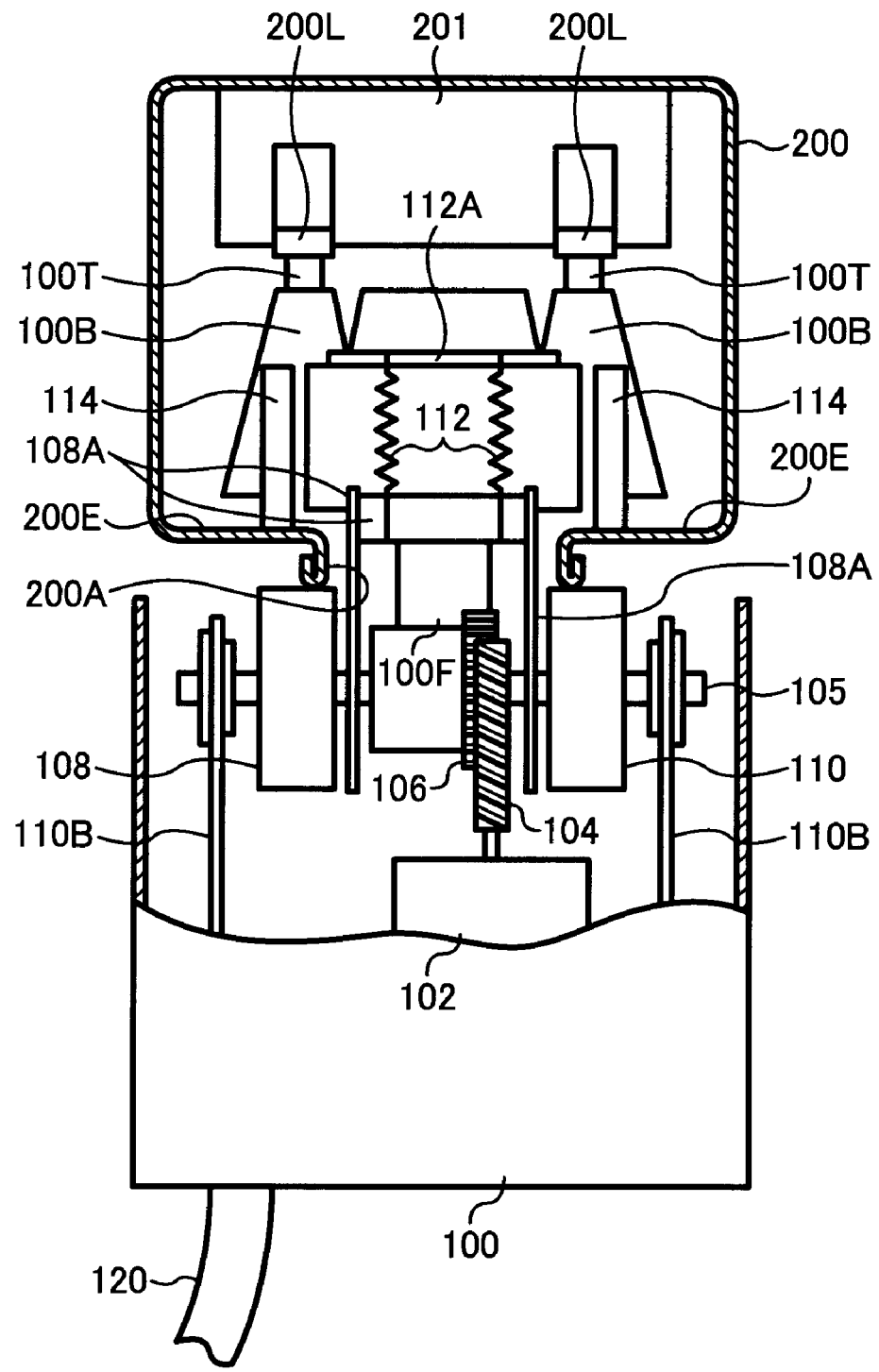
FIG. 17 is a cross section view of the trolley and duct in FIG. 16.
Figure 18:
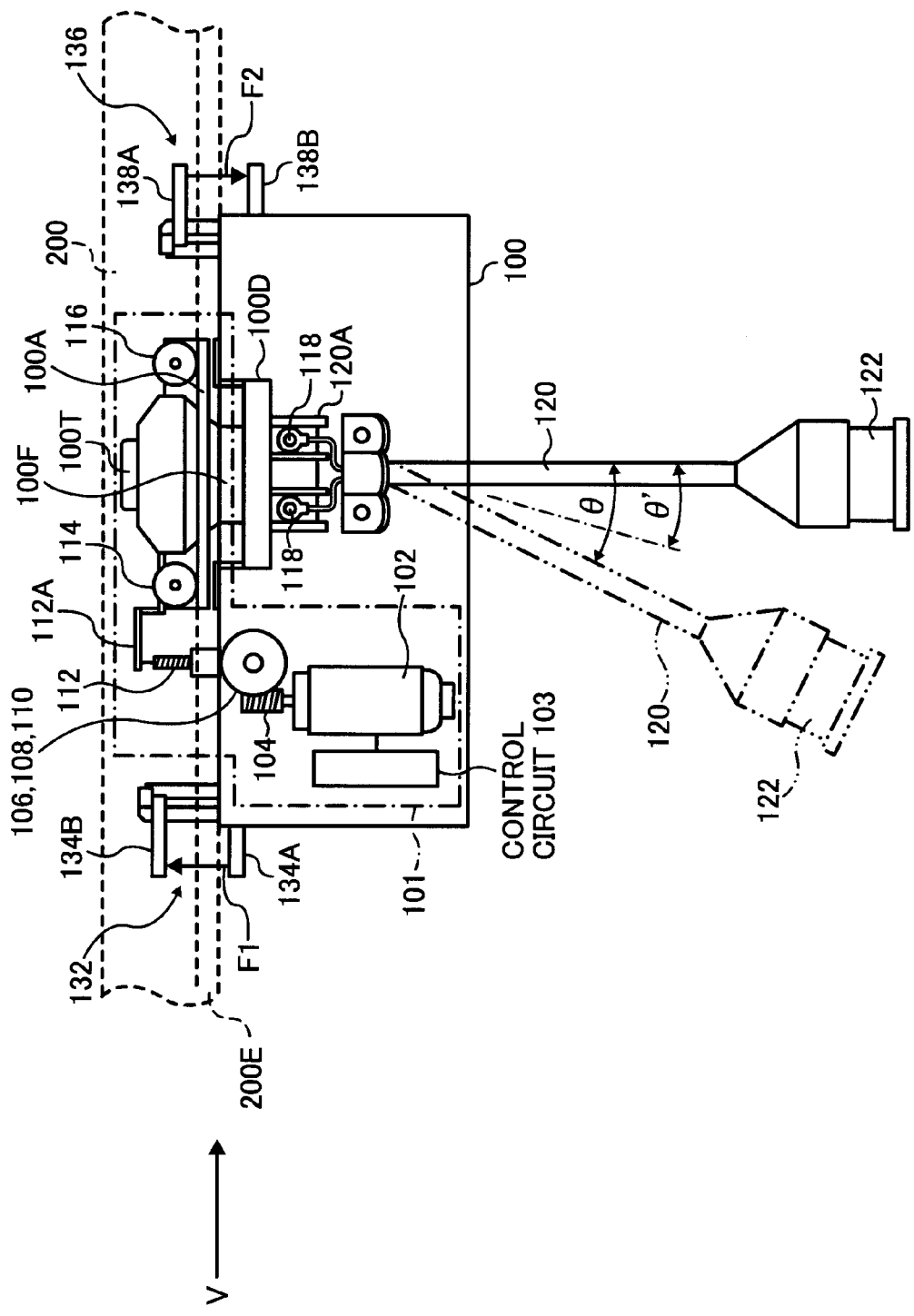
FIG. 18 is an explanation view showing a sloping angle of a code to be detected by a code detection sensor of the trolley in FIG. 16.

FIG. 16 shows a trolley 100 as the power feeding device. FIG. 17 shows a state that the upper portion of the trolley 100 is equipped in the duct 200 comprising a tubular shape, and the upper portion of the trolley 100 is supported. FIG. 18 is a view showing the trolley 100 supported by the duct 200. As shown in FIG. 16, the duct 200, which feeds power to the copying machine 3, is disposed in the ceiling portion of the work area, which assembles the copying machine 3 as a work. The duct 200 has a tubular longitudinal plane, and the lower portion of the duct 200 is formed with an opening portion 200A extending in a longitudinal direction of the duct 200, as shown in the cross section diagram of FIG. 17.

An insulating plate 201 is disposed in the ceiling of the inside of the duct 200. A pair of alternating electric wires 200L is fastened to the insulating plane 201. The alternating electric wires 200L are supplied with 200V single-phase two-wire system alternating electric current as one example.

The upper portion of the trolley 100 is inserted into the inner portion of the duct 200. An upper portion mounting plate 100D is installed in the upper edge portion of a casing 100C of the trolley 100. A supporting column 100F is fixed above the upper portion mounting plate 100D. An upper portion base plate 100A is disposed above the supporting column 100F.

A pair of terminal blocks 100B is installed in the upper portion of the upper portion base plate 100A. Each of the terminal bases 100B is fixed with a terminal 100T, which makes contacts with the alternating current wire 200L. The terminal 100T feeds power to the trolley 100 and the copying machine 3.

Wheels 114, 116 are rotatably supported by the front and back of the upper portion mounting plate 100D. The wheels 114, 116 are mounted on the upper surface of the end portions 200E of the opening portion 200A of the duct 200. The trolley 100 is supported by the wheels 114, 116 to be movable in the longitudinal direction of the duct 200. Wheels 108, 110 for driving the trolley 100 back and forth make contacts with the lower surface of the end portions 200E of the opening portion 200A. The wheels 108, 110 press the lower surface of the end portions 200E from underneath to the above by a coil spring 112.

A supporting plate portion 112A, which horizontally extends toward front, is installed in the front end portion side of the upper portion base plate 100A. A pair of coil springs 112 is hung with the supporting plate portion 112A, and the lower end portions of a pair of coil springs 112 are hung with a pair of parallel bearing plates 108A. A pair of bearing plates 108A is supported by the coil springs to be movable up and down. The shaft 105 of the wheels 108, 110 is supported by the bearing plates 108A.

Figure 19:
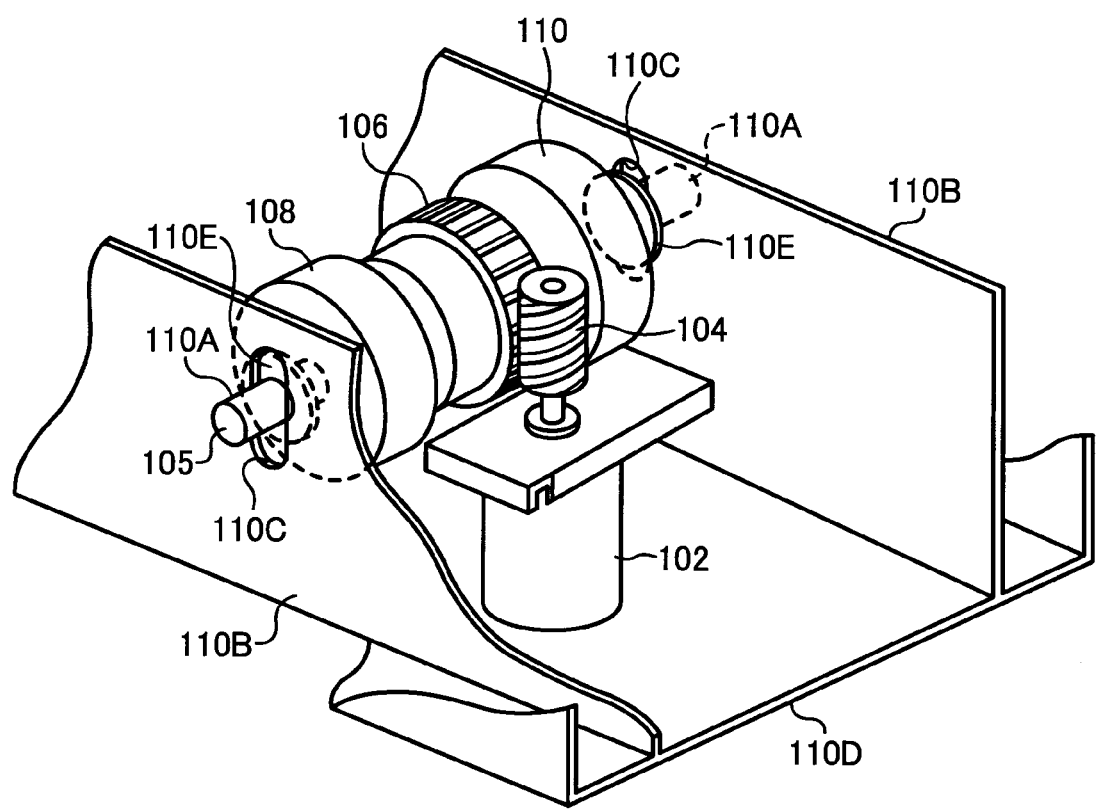
FIG. 19 is a perspective view showing an attachment state of a driving wheel and a motor for moving the trolley in FIG. 16.

FIG. 19 shows a view that the shaft 105 is supported by gutter shaped plates 110 of the casing 100C. As shown in FIG. 19, the both end portions of the shaft 105 is held by elongate holes 110C of the gutter shaped plate portions 110B. The gutter shaped plate portions 110B are fixed to the bottom portion of the casing 100C. The shaft 105 and the wheels 108, 110 are movable up and down along the elongate holes 110C. As described above, the wheels 108, 110 are pulled toward the upper side by a pair of coil springs 112. The coil springs 112 are provided with tension, which can obtain frictional force capable of moving the trolley 100. Reference numerals 110E are stoppers disposed in the vicinity of the both end portions of the shaft 105. The stoppers 110E prevent that the shaft 105 and the wheels 108, 110 dislocate from the elongate holes 110C, 110C. If the rotation torque of the wheel 108 acts on the duct 200, the trolley 100 moves. A motor 102 is fastened onto the bottom portion 110D of the gutter shaped plate portions 110B. A worm 104 engages with a worm wheel 106 fixed to the shaft 105. Regarding the rotation direction of the motor 102, the normal rotation direction moves forward the trolley 100, and the reverse rotation direction moves backward the trolley 100.

FIG. 18 shows a state that the trolley 100 is supported by the duct 200. The lower surface of the upper portion mounting plate 100D (reference to FIG. 16) is provided with a mounting portion 120A, which mounts a code 120. A terminal 100T and the code 120 are mounted on the 120A. The code 120 and the terminal 100T are connected by a copper wire. The alternating electric current of the alternating electric wire 200L can be supplied to a plug 122 through the code 120.

The bottom portion 110D of the gutter shaped plate portions 110B and the bottom portion of the case 100C are provided with an elongate hole 100H (reference to FIG. 16) that the code 120 is rockably inserted. The end portion of the elongate hole 100H is provided with a code detection sensor 130.

The trolley 100 is provided with a power source circuit (not shown). The power source circuit of the trolley 100 transforms the alternating electric current to be supplied from a pair of the alternating electric wires in the duct 200 into predetermined voltage, and then feeds the power so as to supply part of the transformed current to the work side from the plug 122, and also to use for the moving of the trolley 100.

The power source circuit for moving the trolley 100 along the longitudinal direction of the duct 200 feeds the power to the direct current motor 12 as the driving source and also feeds the power to a control circuit, which controls the rotation and stop of the motor 102.

The trolley 100 comprises a driving portion (reference to FIG. 18) having the motor 102, the code detection sensor 130, a foreside approach sensor 132 and a backside approach sensor 136.

The code detection sensor 130 comprises a light-emitting diode 130A and a phototransistor 130B (reference to FIG. 16). The light-emitting diode 130A and the phototransistor 130B are disposed in a position suitably distant from the supported point of the code 120, and also are disposed facing each other across the code 120. The code detection sensor detects the sloped state with respect to the plumb line of the code 120. The code detection sensor 130 comprises the light-emitting diode 130A and the phototransistor 130B. If the code 120 hangs between the light-emitting diode 130A and the phototransistor 130B, the code detection sensor 130 shields the light of the light-emitting diode 130A, and turns off the phototransistor 130B.

In addition, if the work goes ahead and the trolley 100 delays, the code 120 gets away between the light-emitting diode 130A, and the phototransistor 130B. Thereby, the light of the light-emitting diode 130A is received by the phototransistor 130B, and the phototransistor 130B is turned on.

In this case, the code detection sensor 130 comprises the phototransistor 130B and the light-emitting diode 130A to be a transparent interrupter. However the code detection sensor 130 may comprise the phototransistor 130B and the light-emitting diode 130A to be a reflective interrupter, which detects the code 120 by reflecting to the code 120. In addition, a pair of sensors comprising the phototransistor 130B and the light-emitting diode 130A can be disposed in an angle range that the code 120 rocks and also front and back of an angle sloped at a predetermined angle from the vertical direction.

The foreside approach sensor 132 comprises a light-emitting diode 132A and a phototransistor 132B, and is disposed in the font end surface of the moving forward direction of the trolley 100. A pair of projections 134A, 134B projects in the front end surface of the moving forward direction of the trolley 100 facing each other. The light emitting diode 132A and the phototransistor 132B are disposed in a pair of projections 134A, 134B facing each other.

A backside approach sensor 136 comprises a light-emitting diode 136A and a phototransistor 136B, and is disposed in the back end surface of the moving forward direction of the trolley 100. A pair of projections 138A, 138B projects in the back end surface of the moving forward direction of the trolley 10 facing each other. The light-emitting diode 136A and the phototransistor 136B are disposed in a pair of projections 138A, 138B facing each other.

The heights that a pair of projections 134A, 134B of the font side of the trolley 100 is disposed are set different from the heights that a pair of projections 138A, 138B of the back side of the trolley 100 is disposed. More particularly, if a pair of projections 134A, 134B of the front side of the rear trolley 100 is entered between a pair of projections 138A, 138B of the back side of the former trolley 100, the phototransistors 132B, 136B can be shielded.

If the projections 132A, 132B of the front side of the rear trolley 100 are entered between the projections 134A, 134B of the back side of the trolley 100, the phototransistor 136B is turned off by shielding the light of the light-emitting diode 136A, and it is detected that the backside approach sensor 136 approaches the rear trolley 100.

Moreover, if the projections 132A, 132B of the front side of the rear trolley 100 are entered between the projections 134A, 134B of the back side of the former trolley 100, the phototransistor 132B is turned off by shielding the light of the light-emitting diode 132A, and it is detected that the foreside approach sensor 132 approaches the former trolley 100.

As shown by arrows F1, F2 in FIG. 18, the light-emitting diode 136A of the backside approach sensor 136 is disposed under the photodiode 136B, and the light-emitting diode 132A of the foreside approach sensor 132 is disposed on the photodiode 132B; thereby, the advance directions of the light are opposite each other.

As described above, if the illumination directions of the light-emitting diodes 132A, 136A are set opposite to each other in the front and back of the trolley 100, it is prevented that the light of the light-emitting diode 132A of the rear trolley 100 is received by the photodiode 136B of the former trolley 100. Similarly, it is prevented that the light of the light-emitting diode 136A of the back portion of the former trolley 100 is received by the photodiode 132B of the front portion of the rear trolley 100.

The driving portion 101 moves the trolley 100 along the duct 200 in the moving forward and backward directions. As shown in FIGS. 16-20, the driving portion 101 comprises the control circuit 103, motor 102, worm 104, worm wheel 106, running wheels 108, 110, spring device 112, and wheels 114, 116.

More particularly, the worm 104 is coupled to the axis of the motor 102. The worm wheel 106 engages with the worm 104, and the running wheels 108, 110 are coupled to the shaft of the worm wheel 106. Thereby, the rotation force of the motor 102 is transmitted to the running wheels 108, 110 and the end portions 200E of the duct 200 through the worm 104, the worm wheel 106 and the rotation shaft 105.

The shaft of the running wheels 108, 110 is held up to the duct 200 side by the coil springs 112. As shown in FIGS. 16, 17, the running wheels 108, 110 make contact with the lower end portion of the duct 200 with appropriate frictional force. On the other hand, the wheels 114, 116 support the trolley 100 in a movable manner in the duct 200.

More particular, the trolley 100 can freely run in either direction by the running wheels 108, 110 in accordance with the rotation direction of the motor 102 by controlling the motor 102 with the control circuit 103.

Figure 20:
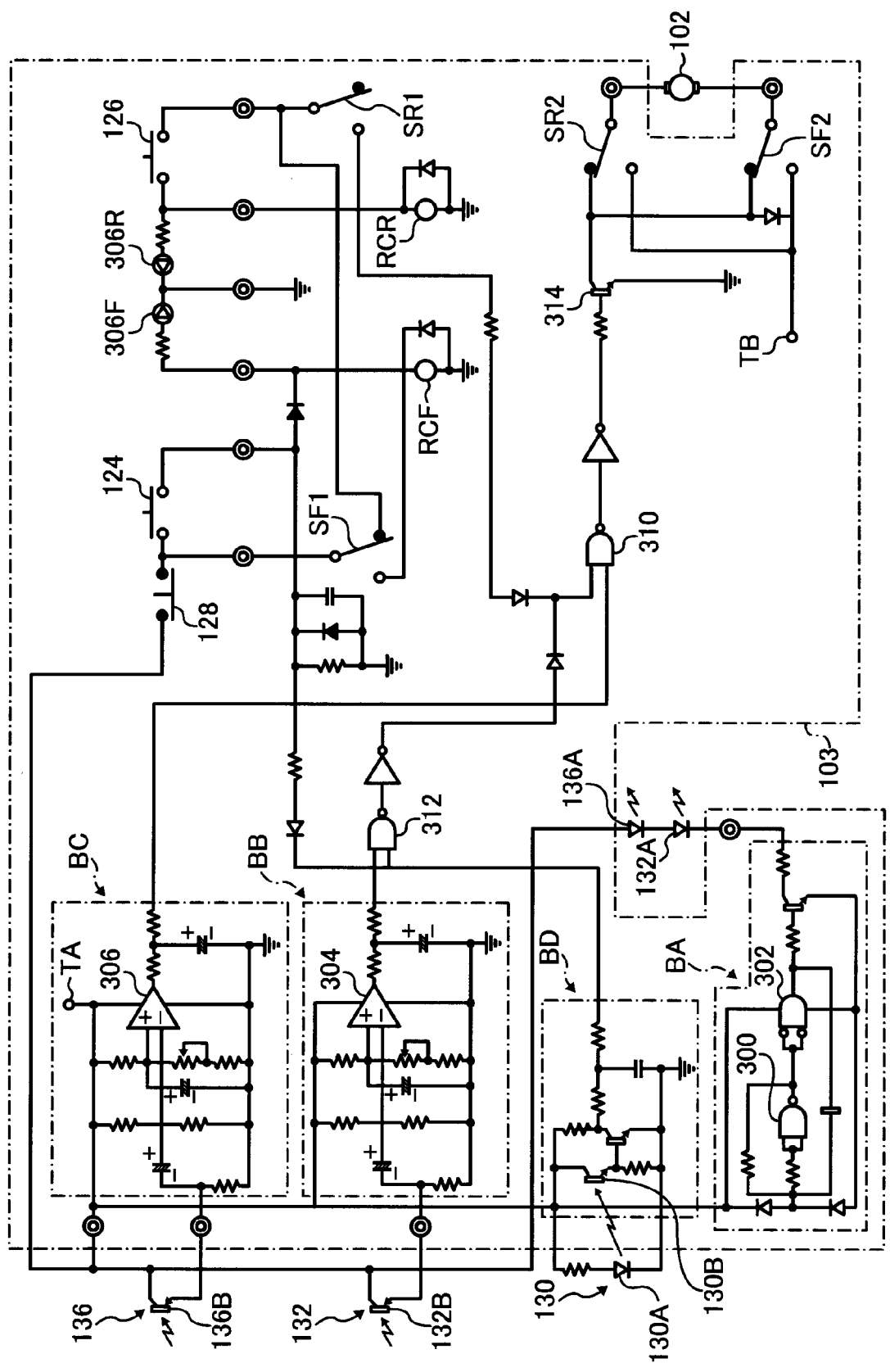
FIG. 20 is a circuit view showing a control circuit disposed in the trolley in FIG. 16.
Figure 22:
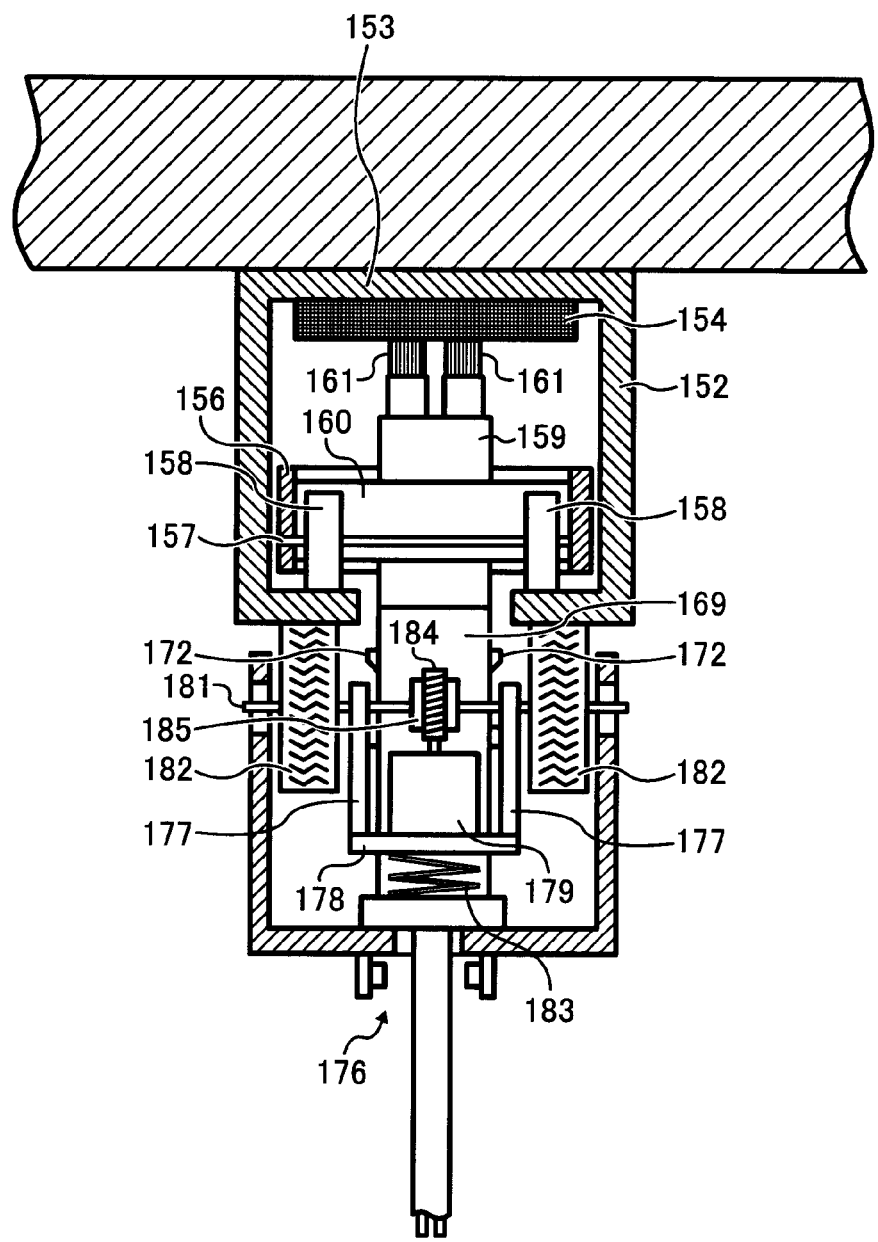
FIG. 22 is a cross section view in a width direction of the trolley in FIG. 21.
Figure 23:
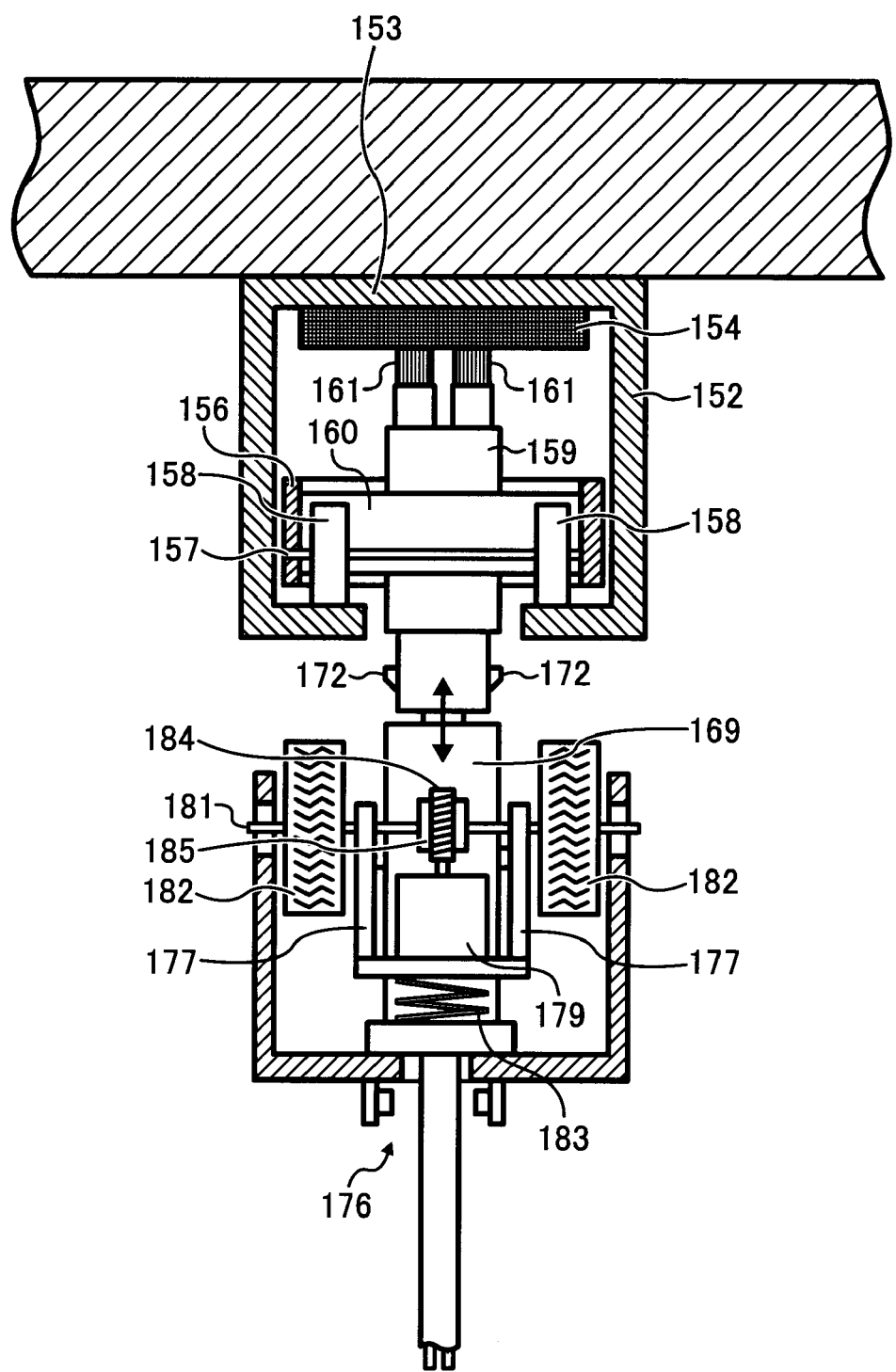
FIG. 23 is an explanation view showing a state that a lower portion casing body is connected to an upper portion casing body portion of the trolley in FIG. 21.

FIG. 20 shows the structure of the control circuit 103. In FIG. 20, a switch 124 is for moving forward the trolley 100 toward the moving direction of the work. A switch 126 is for moving backward the trolley 100 and also is for getting back the trolley 100. A switch 128 is for moving the trolley 100 and also stopping the movement of the trolley 100.

A predetermined positive voltage is applied to terminals TA, TB. A block BA comprising NAND gates 300, 302 is the circuit, which emits light emitting diodes 132A, 136A. A block BB centering on an operational amplifier 304 is a circuit, which conducts detection and output of the foreside approach sensor 132. In the BB block, the output turns from the logical value H level to L level if the detection operation is performed. A block BC centering on an operational amplifier 306 is a circuit, which conducts detection and output of the backside approach sensor 136. In the block BC, the output turns from the logical value H level to the L level if the detection operation is performed.

A block BD centering on the phototransistor 130B is a circuit, which conducts detection and output of the code detection sensor 130. In the block BD, the output changes from the logical value L level to H level if the code 120 is no longer detected.

Light emitting diodes 306F, 306R light up when the trolley 100 moves forward and backward. A pair of relay elements comprises a relay coil RCF and relay contacts SF1, SF2. A pair of relay elements comprises relay coil RCR and relay contacts SR1, SR2. Those relay contacts SF1, SF2, SR1, SR2 normally have contact with the contact points of the black marks, and shift to the white marks by the power distributions of the relay coils RCF, RCR to have contact with the contact points of the white marks.

Next, the entire operation of the second embodiment will be explained based on the circuit structure in FIG. 20.

At first, the plug of the code extending from the copying machine 3 is coupled to the plug 122. Next, if an operator temporary turns off the switch 124, the two inputs of the NAND gate 312 become the H level, and also the relay contact points SF1, SF2 operate and maintain by the power distribution to the relay coil RCF. Thereby, the output of the NAND gate 310 becomes the L level, and the transistor 314 is conducted, and then the power is fed to the motor 102. Therefore, the trolley 100 freely runs while the switch 124 being turned off.

The copying machine 3 moves in the direction of the arrow FP along the movement of the carriage 4. The driving force by the movement of the copying machine 3 is transmitted through the codes 4A, 120, and then the trolley 100 can moves in the direction of arrow FQ.

More particularly, as shown in FIG. 18, by the movement of the copying machine 3, the movement of the trolley 100 delays, and the an angle θ in the vertical direction of the code 120 becomes larger than a predetermined sloping angle, this is detected by the code detection sensor 130, and then the output of the block BD becomes the H level. A predetermined sloping angle defined for the code 120 is set that the tension, which can move the trolley 100 in the horizontal position by the movement of the copying device 3, is applied, for example.

In FIG. 20, if the foreside approach sensor 132 does not detect the abnormal approach, and the output of block BB is the H level, and also if the output of block BD becomes the H level, the output of the NAND gate 312 becomes the L level.

In addition, if the backside approach sensor 136 does not detect the abnormal approach, and the output of block BC is the H level, the output of the NAND gate 310 becomes the L level, the motor 102 is powered, and the trolley 100 freely runs so as to follow the copying machine 3.

In the free running state of the trolley 100, if the trolley 100 approaches the former trolley, and the abnormal approach is detected, the output of block BB becomes the L level. Thereby the output of NAND gate 312 becomes the H level. Moreover, since the output of NAND gate 310 turns to the H level, the transistor 314 becomes a non-conduction state, and the power feeding to the motor 102 is stopped, and then the trolley 100 is stopped to avoid crush.

Next, if the trolley 100 moves to follow the copying machine 3, and the sloping angle θ is reduced to an angle θ' smaller than a predetermined sloping angle, the output of block BD becomes the L level. Thereby, the output of the NAND gate 312 becomes the H level, and the output of NAND gate 310 becomes the H level. Therefore, the trolley 100 stops, and the trolley 100 again moves in the direction of arrow FQ by the tension of the codes 4A, 120.

If the above assembly and adjustment operation of the copying machine 3 is repeated, the trolley 100 moves forward without breaking the codes 4A, 120 or disconnecting the plugs 4B, 122, and also without crushing the trolleys.

If the assembly and adjustment operation of the copying machine 3 is completed, the operator stops the power feeding to the copying machine 3, etc., by disconnecting the plugs 4A, 122. Moreover, if the operator presses the switch 128, the relay coil RCF restores and the relay coil RCR is conducted, and then the relay contacts SR1, SR2 operate. Thereby, the relay RCR maintains and the two input of the NAND gate 310 become the H level, and the output becomes the L level, so the current flows in the direction opposite to the above described case with respect to the motor 102. Therefore, the trolley 100 moves backward in the opposite direction.

In this case, if the trolley 100 approaches the rear trolley 100, the backside approach sensor 136 detects the abnormal approach, and the output of block BC becomes the L level. Then, the output of NAND gate 310 becomes the H level, and the power feeding to the motor 102 is stopped, and the moving backward of the trolley 100 is stopped. According to the above operation, the trolley 100 automatically restores, and also the crush with another trolley can be avoided.

Third Embodiment

FIG. 21A shows a trolley according to a third embodiment of the present invention. In FIGS. 21A, 21B, reference number 150 denotes a trolley, 151 denotes a ceiling of a work area of a copying machine 3 as a work, 152 denotes a duct having C-shaped cross section formed with a groove in the lower side, 153 denotes an insulating body provided in the ceiling portion of the duct 152, 154 denotes an alternating electricity distribution wire, and 155 denotes an end portion of the groove of the duct 152. The upper portion of the trolley 150 comprises a frame-shaped upper portion casing body 156, and the upper portion casing body 156 is disposed in the inner portion of the duct 152. Rotation shafts directed to the horizontal direction are rotatably mounted on the front and back of the upper casing body 156, and a wheel 158 is mounted on each of the rotation shafts 157. In the upper casing body portion 156, the wheels 158 can freely move the upper portion of the end portion 155 of the duct 152. A terminal base 169 is disposed in the vicinity of the central portion of the upper casing body portion 156. A pair of supporting plate portions 160 attached to the inner side of the upper casing body 156 is fixed to the terminal base 159 by a screw. A pair of terminals 161 is mounted on the upper surface of the terminal base 159 in an upwardly and downwardly movable manner. A pair of terminals 161 is biased by a spring (not shown) provided in the inner portion of the terminal base 159 so as to push the alternating electricity distribution wire 154 from bottom up. Thereby, when the upper casing body portion 156 moves the inner portion of the duct 152, the terminals 161 constantly have contact with the alternating electricity distribution wire 154 to supply the alternating current. A lower casing body portion 162 is detachably fixed to the lower portion of the terminal base 159.

A foreside approach detection sensor 163 is attached to the front portion of the upper casing body portion 156. A backside approach detection sensor 164 is attached to the rear portion of the upper casing body portion 166.

The foreside approach detection sensor 163 comprises a pair of parallel plates 165 fixed to the frame portion of the front side of the upper casing body portion 156, a light emitting diode 166A attached to one of the parallel plates 165, and a phototransistor 166B attached to the other of the parallel plates 165.

The backside approach detection sensor 164 comprises a pair of parallel plates 167 fixed to the frame portion of the back side of the upper casing body portion 156, a light-emitting diode 168A attached to one of the parallel plates 167, and a phototransistor 168B attached to the other of the parallel plates 167.

A tubular connecting portion 169 projects in the bottom portion of the box-shaped lower portion casing body 162. The connecting portion 169 is detachably connected to the lower portion of the terminal base 159 of the upper casing body portion 156, and is fixed thereto. An electric wire to be connected to the terminal 161 is wired to the inner portion of the terminal base 159, and an elementary part of a code 170 to feed power to a code 171 extending from the copying machine is equipped in the connecting portion 169. The elementary portion of the code 170 and the electric wire of the inner portion of the terminal base 159 are detachably connected by an outlet and plug, for example. The connecting portion 169 latches with a pawl 172 formed in the side face of the terminal base 159, and is fixed thereto.

The lower portion casing body portion 162 comprises an approximate box shape. The connecting portion 169 projects in the vicinity of the central portion of the bottom portion 173 of the lower portion casing body portion 162. The lower portion of the connecting portion 169 of the bottom portion 173 is formed with an opening portion 174 which allows the rocking of the code 170 in the front and back direction. The opening portion 174 is formed to extend in the moving direction of the trolley 150. A tube portion 175 is formed in the end portion of the opening portion 174 and the lower side of the lower portion casing body portion 162. A code detection sensor 174 is provided in the inner portion of the tube portion 175. The code detection sensor 176 comprises a light emitting diode LED and a phototransistor PTR. If the light of the light emitting diode LED is shielded by the code 170, the phototransistor PTR is turned off, and the code detection sensor 176 detects that that the code 170 positions within a predetermined sloping angle θ including the vertical direction.

Crank-shaped arms 177 are swingably attached to the right and left side face portions of the connecting portion 169. Each of the portions of free end portion sides of a pair of arms 177 is a flat plate portion 178. A motor 179 and a pair of shaft supporting plates 180 are fixed on the flat plate portion 178. A driving shaft 181 is rotatably attached between a pair of the shaft supporting plates 180. Driving wheels 182 are rotatably attached to the both sides of the rotation shaft 181, respectively. The both end portions of the rotation shaft 181 are inserted into guide holes (not shown) formed in the side wall portion 182 of the lower portion casing body portion 162 in an upwardly and downwardly movable manner. The guide hole extends in the up and down direction, and guides the up and down movement of the rotation shaft 181. A holding tube portion 184 of a coil spring 183 is mounted between the flat plate portion 178 and the bottom portion 173 of the lower portion casing body portion 162. The coil spring 183 presses the driving wheel 182.to the end portion 155 of the duct 152. A worm 184 is fixed to the rotation shaft of the motor 179, and the worm 184 engages with a worm wheel 185 fixed to the rotation shaft 181. The end portion 155 of the duct 152 is sandwiched by the driving wheel 182 and the wheel 157. If the rotation shaft of the motor 179 rotates, the worm wheel 185 rotates by the rotation of the worm 184, and then the trolley 150 moves in a predetermined direction by the rotation of the driving wheel 182.

A connecting portion 186 connecting with the code 171 is attached to the lower end portion of the code 170. The connecting portion 186 comprises a socket that the plug of the code 171 is inserted, an forward movement switch 187A, which sends a command to move forward the trolley 150, a backward movement switch 187B, which feeds a command to move backward the trolley 150, and a stop switch 187C, which feeds a command to stop the moving trolley 150. The inner portion of the lower portion casing body portion 162 is provided with a power source circuit 188 that part of the power is supplied from the terminal 161, and a control circuit 189, which controls the forward movement, backward movement, stop and the like of the trolley 150. The power source circuit 188 loads part of the alternating current supplied to the terminal 161 from the electric distribution wire 154, and converts the current to the direct current after transforming to an appropriate voltage, and then supplies to the control circuit 189, foreside approach sensor 163, backside approach sensor 164, code detection sensor 176 and motor 179.

FIG. 21B shows a modification example of the code detection sensors 194A, 194B, which detect the slope state of the code 170. The code detection sensors 194A, 194B comprise micro switches MS1, MS2. The micro switches are disposed in the front and back direction that the trolley 150 moves. More particularly, the small micro switch MS1 is disposed in the end portion of the front side of the opening portion 174, and the micro switch MS2 is disposed in the end portion of the back side of the opening portion 174. The micro switch MS1 detects a state of the lower end portion of the code 170 having forward sloping, i.e., the trolley 150 is late for the copying machine 3 as a work. The micro switch MS detects a state of the lower end portion of the code 170 having backward sloping, i.e., the trolley 150 comes before the copying machine 3 as a work. If the micro switches MS1, MS2 turn on by the pressing of the code 170, it is detected that the sloping angle of the code 170 becomes a predetermined eloping angle θ or more. If the detected result is output to the microcomputer 190, the microcomputer 190 can rotate the motor 179 in a predetermined direction.

FIG. 24 shows one example of the control circuit 189. The control circuit 189 comprises the microcomputer 190, a relay circuit 191 for normal rotation of a motor, a relay circuit 192 for reverse rotation of a motor, and a main switch 198 of the trolley 150.

The microcomputer 190 is connected with the forward movement switch 187A, backward movement switch 187B, stop switch 187C, code detection sensor 176, foreside approach detection sensor 163, backside approach detection sensor 164, main switch 193 of the trolley 150 and the like. The microcomputer 190 is powered from the power source circuit 188. The relay circuit 191 for normal rotation of a motor supplies driving current to the motor 179 for normally rotating the motor 179 from the power source circuit 188 based on the normal rotation command signal of the microcomputer 190. The relay circuit for reverse rotation of a motor 192 supplies driving current to the motor 179 for reversely rotating the motor 179 from the power source circuit 188 bared on the reverse rotation command signal of the microcomputer 190.

In the state that the main switch 193 is turned on (A1), and the forward movement switch 187A is turned on (A2), when the code detection sensor 176 detects that the code 170 slopes at a predetermined sloping angle θ or more (A3) for the factor that the trolley 150 is late for the moving of the copying machine 3, the foreside approach sensor 163 and backside approach sensor 164 do not detect the abnormal approach (A4), (A5), and the stop switch 187C is not pressed (A6), the microcomputer 190 moves forward the trolley 150. More particularly, if all of the above conditions (A1) to (A6) are achieved, the microcomputer 190 normally rotates the motor 179 by operating the relay circuit 191 for normal rotation of a motor.

With this forward movement mode, in the state that the main switch 193 is turned off (A1') and the forward movement switch 187A is turned off (A2'), when the code detection sensor 176 detects that the code 170 hangs within a predetermined sloping angle θ (A3') because the delay of the trolley 150 with respect to the movement of the copying machine 3 is resolved, the foreside approach sensor 163 and backside approach sensor 164 detect the abnormal approach (A4', A5'), and the stop switch 187C is pressed (A6'), the microcomputer 190 stops the motor 179. More particularly, if any of the above conditions (A1') to (A6') is achieved, the microcomputer 190 stops the motor 179 by stopping the operation of the relay circuit 191 for normal rotation of a motor.

In the state that the main switch 193 is turned on (B1), and the backward switch 187B is turned on (B2), when the code detection sensor 176 detects that the code 170 slopes at a predetermined sloping angle θ or more (B3) for the factor that the trolley 150 comes before the moving of the copying machine 3, the foreside approach sensor 163 and backside approach sensor 164 do not detect the abnormal approach (B4), (B5), and the stop switch 187C is not pressed (B6), the microcomputer 190 moves backward the trolley 150. More particularly, if all of the above conditions (B1) to (B6) are achieved, the microcomputer 190 reversely rotates the motor 179 by operating the relay circuit 192 for reverse rotation of a motor.

With this backward movement mode, in the state that the main switch 193 is turned off (B1') and the forward movement switch is turned off 187A (B2'), when the code detection sensor 176 detects that the code 170 hangs within a predetermined sloping angle θ (B3') because the delay of the trolley 150 with respect to the movement of the copying machine 3 is resolved, the foreside approach sensor 163 and backside approach sensor 164 detect the abnormal approach (B4', B5'), and the stop switch 187C is pressed (B6'), the microcomputer 190 stops the motor 179. More particularly, if any of the above conditions (B1') to (B6') is achieved, the microcomputer 190 stops the motor 179 by stopping the operation of the relay circuit 192 for reverse rotation of a motor.

FIG. 25 shows another example of the control circuit 189. The control circuit 189 comprises the microcomputer 190, the relay circuit 191 for normal rotation of a motor, the relay circuit 192 for reverse rotation of a motor, and the main switch 193 of the trolley 150. The microcomputer 190 is connected with the forward movement switch 187A, backward movement switch 187B, stop switch 187C, code detection sensor 194A, which detects that the trolley comes before the copying machine 8, code detection sensor 194B, which detects that the trolley is late for the copying machine 3, the foreside approach detection sensor 163, the backside approach detection sensor 164, the main switch 193 of the trolley 150 and the like.

In the state that the main switch 193 is turned on (C1), and the forward movement switch 187A is turned on (C2), when the code detection sensor 194B detects that the trolley 150 is late for the moving of the copying machine 3 (C3), the stop switch 187C is not pressed (C4), and the foreside approach sensor 163 and the backside approach sensor 164 do not detect the abnormal approach (C5), (C6), the microcomputer 190 moves forward the trolley 150. More particularly, if the above conditions (C1) to (C6) are achieved, the microcomputer 190 normally rotates the motor 179 by operating the relay circuit 191 for normal rotation of a motor.

With this forward movement mode, in the state that the main switch 193 is turned off (C1'), and the forward movement switch 187A is turned off (C2'), when the code detection sensor 194B detects that the delay of the trolley 150 with respect to the movement of the copying machine 3 is resolved (C3'), the stop switch 187C is pressed (C4), and the foreside approach sensor 163 and backside approach sensor 164 detect the abnormal approach (C5', C6'), the microcomputer 190 stops the motor 179. More particularly, if any of the above conditions (C1') to (C6') is achieved, the microcomputer 190 stops the motor 179 by operating the relay circuit 191 for normal rotation of a motor.

In the state that the main switch 193 is turned on (D1), and the backward switch 187B is turned on (D2), when the code detection sensor 194A detects that the trolley 150 comes before the moving of the copying machine 3 (D3), the foreside approach sensor 163 and backside approach sensor 164 do not detect the abnormal approach (D4), (D5), and the stop switch 187C is not pressed (D6), the microcomputer 190 moves backward the trolley 150. More particularly, if the above conditions (D1) to (D6) are achieved, the microcomputer 190 reversely rotates the motor 179 by operating the relay circuit 192 for reverse rotation of a motor.

With this backward movement mode, in that state that the main switch 193 is turned off (D1') and the forward movement switch. 187A is turned off (D2'), when the code detection sensor 194A detects the dissolution of precedence of the trolley 150 (D3'), the foreside approach sensor 163 and backside approach sensor 164 detect the abnormal approach (D4', D5'), and the stop switch 187C is pressed (D6'), the microcomputer 190 moves backward the motor 179. More particularly, if the above conditions (D1') to (D6') are achieved, the microcomputer 190 stops the motor 179 by stopping the operation of the relay circuit 192 for reverse rotation of a motor.

As described above, in the work conveying apparatus of the second and third embodiments, the duct 200 (feeding device) extending in the moving direction of the copying machine 3 as a work is placed on the upper portion of the conveying area of the carriage 4 of the work conveying device, and the trolley 100, 150 (feeding device), which feeds to at least one of the carriage 4, copying machine or tool, is movably supported by the duct 200. The trolley 100, 150 is provided with the code detection sensor 130, 170 as work detection device, which detect that the copying machine 3 moves. The trolley 100, 150 comprises the control circuit 130, which controls the moving of trolley 100, 150 to follow the copying machine 3 when the code detection sensor 130, 176 detects the moving of the copying machine 3, and the motor 102, 179 to be driven by the control circuit 103 and the microcomputer 190.

Therefore, when the copying machine 3 moves, the trolley 100, 150 moves while following the moving of the copying machine 3, so the tension is not affected on the code 120, 170 connecting the trolley 100, 150 and the copying machine 3; thus, the code 120, 170 is not disconnected and broken. In addition, the structure of the trolley 100, 150 is simple and requires a low cost.

Second, the foreside approach sensor 132 and the backside approach sensor 163 as the approach detection devices, which detect the approach with an object, are provided in the front and back of the trolley 100, 150. The control circuit 103 and the microcomputer 190 avoid the crush between the trolleys when the foreside approach sensor 132 and the backside approach sensor 163 detect the abnormal approach, respectively. Therefore, the foreside approach sensor 132 and the backside approach sensor 163 detect the abnormal approach with an object in the front or the back of the trolley 100, 150, and the moving trolley 100, 150 is stopped.

Third, the work detection device, which detects the movement of the copying machine 3, detects the movement of the copying machine 3 based on a sloping angle θ with respect to the plumb line of the code 170, which feeds to the work such as the copying machine 3. The control circuit 103 and the microcomputer 190 drive the motor 102, 179 to follow the work such as the copying machine 3 when the sloping angle of the code 120, 170 detected by the code detection sensor 130, 176, MS1, MS2 becomes a predetermined angle or more.

Therefore, if the code 120, 170 is within a range of a predetermined angle θ, which allows with respect to the right under the trolley 100, 150 or the vertical direction, the trolley 100, 150 is in a resting condition. If the work of the copying machine 3 moves and the sloping angle of code 120, 170 exceeds a predetermined angle θ, the code detection sensor 130, 176, MS1, MS2 detects this, and outputs to the microcomputer 190. The control circuit 103 and the microcomputer 190 can automatically moves the trolley 100, 150 in the moving direction of the trolley 100, 150 in the moving direction of the copying machine 3 by driving the motor 102, 179. Therefore, the moving operation of the trolley 100, 150 is not required, the disconnection and breaking of the code 120, 170 for feeding can be prevented, and also it requires a low cost.

Moreover, the duct 200 extending in the moving direction of the copying machine 3 and trolley 100, 150 are disposed in the upper portion of the conveying area of the carriage 4 of the work conveying device. The trolley 100, 150 is provided with the code detection sensor 130, 176. The trolley 100, 160 is moved when the code detection sensor 130, 176 detects the moving of the copying machine 3. Therefore, the strong tension, which is affected on the code 120, 170, can be avoided, and the disconnection and breaking of the code 120, 170 can be prevented, and also the worker can concentrate the work without focusing on the movement of the code 120, 170 and the trolley 100, 150.

In addition, in the manufacturing method of an image forming apparatus such as the copying machine 3, printer, or facsimile, if the manufacturing is performed by using the duct 200 and the trolley 100, 150, the copying machine 3, etc., of the work can be powered from the code 120, 170. Therefore, the disconnection and the breaking of the code 120, 170 is prevented, the manufacturing efficiency is improved, a low cost and saving energy can be promoted in the manufacturing of the image forming apparatus, and also the exchange, repair, change, etc., of the work or the work conveying apparatus can be easily conducted.

As described above, it should be noted that although the present invention has been described with respect to specific embodiments, the invention is not limited to these specific embodiments.

Especially, in the above embodiments, the image forming apparatus such as the copying machine, printer and facsimile are used as the work. However, the application filed of the work conveying apparatus is not limited thereto. The work conveying apparatus can be applied to various products such as an electric device, home electric appliances, and vehicle.

According to the present invention, as mentioned above, because the work conveying device can be moved with reciprocating movement by means of the drive device to convey the work, the work can be conveyed by a small scaled work conveying apparatus without a large scaled conveying apparatus for long distance conveyance or continuous conveyance being used. Therefore, an inexpensive and simple work conveying apparatus can be provided, and the change of the conveying path and the conveying system can be easily accomplished.

In addition, tact control to execute operation at regular intervals can be accomplished.

Furthermore, because the work conveying device is configured to latch with the latching portion provided on the transmission device extending in the reciprocating direction, the work conveying device can be intermittently moved by reciprocating the transmission device through the drive device to feed the work.

What is claimed is:

1. A work conveying apparatus, comprising:
   a work conveying device configured to support at least one work;
   a drive device configured to reciprocate a predetermined distance along a predetermined axis; and
   a latching portion formed on at least one of the work conveying device and the drive device, and configured to latch the work conveying device with the drive device and move the work conveying device when the drive device is moved in one direction along the predetermined axis;
   wherein the drive device reciprocates at the same level as a floor surface on which the work conveying device is moved.

2. The work conveying apparatus according to claim 1, further comprising a guiding device to guide the work conveying device so as to form a conveying path of the work.

3. The work conveying apparatus according to claim 2, wherein the guiding device has a length of integral multiple of a conveying distance where the work conveying device is moved through one reciprocating movement of the drive device.

4. The work conveying apparatus according to claim 3, wherein the guiding device is configured to form one conveying path extending in a conveying direction of the work conveying device.

5. The work conveying apparatus according to claim 4, wherein the transmission device and the guiding device are used together.

6. The work conveying apparatus according to claim 4, wherein the guiding device includes a pair of guide rails extending in the conveying direction of the work conveying device.

7. The work conveying apparatus according to claim 1, wherein the work conveying device includes at least one carriage having casters,
   wherein a distance between the carriage and the floor surface is set to be larger than a distance of an upper end portion of the drive device from the floor surface.

8. The work conveying apparatus according to claim 7, wherein the carriage includes a base portion engageable with the latching portion and a work mounting portion on which the work is mounted,
   a supporting member provided between the base portion and the work mounting portion, and configured to adjust a height of the base portion and the work mounting portion.

9. The work conveying apparatus according to claim 7, wherein each of the casters has a hardness sufficient to support a load in mounting the work on the carriage without being deformed and is formed by a nonferrous material lighter than iron.

10. The work conveying apparatus according to claim 1, wherein the drive device includes either a pneumatic cylinder or hydraulic cylinder, each of which having a cylinder tube and a piston rod,
    wherein the work is conveyed through latching of a leading end portion of the piston rod with the work conveying device by the latching portion in either expansion or contraction of the piston rod.

11. The work conveying apparatus according to claim 10, wherein the cylinder tube has a control device to control a period of expansion and contraction of the piston rod.

12. The work conveying apparatus according to claim 11, wherein the cylinder tube has an openable and closable relief valve for relieving a medium in the cylinder under a predetermine condition.

13. The work conveying apparatus according to claim 1, wherein the drive device comprises a linear motor configured to move the drive device along the predetermined axis.

14. The work conveying apparatus according to claim 1, wherein the work conveying device comprises a plurality of work conveying devices,
    wherein a supplementary conveying device is disposed between the adjacent work conveying devices.

15. The work conveying apparatus according to claim 14, wherein the supplementary conveying device comprises a supplementary carriage configured to mount thereon a part of the work and adjust an interval between the adjacent work conveying devices.

16. The work conveying apparatus according to claim 15, wherein a connecting mechanism to connect to the supplementary conveying device and the work conveying device is provided.

17. The work conveying apparatus according to claim 1, further comprising a conveying path formed to convey the work, a buffering member disposed at the vicinity of a conveying entrance of the conveying path and configured to receive a newly conveyed work conveying device temporarily, and a control device,
    wherein the control device controls the buffering member to allow the buffering member to project in the conveying path after feeding the already conveyed work conveying device in a conveying direction when conveying the new work conveying device following the work conveying device already conveyed in the conveying path, and support the conveyed work conveying device.

18. The work conveying apparatus according to claim 1, wherein the latching portion configured to latch the work conveying device includes a one way clutch configured to achieve the latching in the one direction along the predetermined axis,
    wherein the one way clutch is provided on any of the work conveying device, the drive device and the transmission device.

19. The work conveying apparatus according to claim 1, further comprising a power supplying equipment extending in a conveying direction of the work and provided above a conveying area of the work conveying device, and at least one power feeding device movably supported on the power supplying equipment and configured to feed power to any of the work, the work conveying device or a tool,
    wherein the power supplying equipment includes a work detection device to detect the movement of the work, a control device configured to control movement of the power feeding device in response to the work detection device detecting the movement of the work, and a drive device driven by the control device.

20. The work conveying apparatus according to claim 19, further comprising access detection devices provided in back and front of the power feeding device and configured to detect that an object is nearing,
    wherein the control device controls the movement of the power feeding device so as to prevent the power feeding device from impacting the object in response to either the front access detection device detecting front abnormal closeness or the back access detection device detecting back abnormal closeness.

21. The work conveying apparatus according to claim 19, wherein the work detection device detects the movement of the work based on an inclined angle to a perpendicular line of a cord configured to feed a power to the work, wherein the control device allows the drive device to drive so that the work is moved following the movement of the power feeding device based on variation of the inclined angle of the cord detected by the work detection device.

22. The work conveying apparatus of claim 1, further comprising:

a guide rail provided on the floor surface;

wherein the drive device includes an extendable piston rod and the piston rod is covered by the guide rail.

23. A work conveying apparatus, comprising:

a work conveying device configured to support at least one work;

a drive device configured to reciprocate a predetermined distance along a predetermined axis;

a transmission device connected to the drive device and extending along the predetermined axis to form a conveying path of the work; and a latching portion provided to cooperate the work conveying device with the drive device and the transmission device, and configured to latch the work conveying device with the drive device and move the work conveying device when the drive device is moved in one direction along the predetermined axis;

wherein the drive device reciprocates at the same level as a floor surface on which the work conveying device is moved.

24. The work conveying apparatus according to claim 23, wherein the transmission device includes a plurality of reciprocable pipe modules arranged in the reciprocating direction and connecting sections which are connectable to the pipe modules to vary a length of the connected pipe modules depending on a conveying distance of the work conveying device.

25. The work conveying apparatus according to claim 24, wherein the transmission device has a length of integral multiple of a conveying distance where the work conveying device is moved through one reciprocation of the drive device.

26. The work conveying apparatus according to claim 23, wherein the work conveying device includes at least one carriage having casters, wherein a distance between the carriage and the floor surface is set to be larger than a distance of an upper end portion of each of the drive device and the transmission device from the floor surface so that the work conveying device passes over the drive device and the transmission device.

27. The work conveying apparatus of claim 23, further comprising:

a guide rail provided on the floor surface;

wherein the drive device includes an extendable piston rod and the piston rod is covered by the guide rail.

\* \* \* \* \*